(12) United States Patent
Gomi et al.

(10) Patent No.: US 10,129,236 B2
(45) Date of Patent: Nov. 13, 2018

(54) DETERMINATION APPARATUS, DETERMINATION METHOD, AND NON-TRANSITORY COMPUTER READABLE STORAGE MEDIUM

(71) Applicant: YAHOO JAPAN CORPORATION, Tokyo (JP)

(72) Inventors: Hidehito Gomi, Tokyo (JP); Teruhiko Teraoka, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 141 days.

(21) Appl. No.: 15/216,235

(22) Filed: Jul. 21, 2016

(65) Prior Publication Data

US 2017/0111340 A1   Apr. 20, 2017

(30) Foreign Application Priority Data

Oct. 20, 2015   (JP) ................................ 2015-206280

(51) Int. Cl.
*H04L 29/06* (2006.01)

(52) U.S. Cl.
CPC ............ *H04L 63/08* (2013.01); *H04L 63/083* (2013.01); *H04L 63/0861* (2013.01)

(58) Field of Classification Search
CPC .... H04L 63/08; H04L 63/083; H04L 63/0861
USPC ........................................................ 726/7
See application file for complete search history.

(56) References Cited

U.S. PATENT DOCUMENTS 8,646,060 B1 *   2/2014   Ben Ayed ........... H04L 63/0853
                                                        726/9

FOREIGN PATENT DOCUMENTS

| JP | 2010-204808 A | 9/2010 |
|----|---------------|--------|
| JP | 2012-202747 A | 10/2012 |
| JP | 2015-090589 A | 5/2015 |
| JP | 5731726 B1 | 6/2015 |

OTHER PUBLICATIONS

Nov. 29, 2016 Office Action issued in Japanese Patent Application No. 2015-206280.
Android 5.0 Lollipop Quick Start Guide; Mar. 31, 2015; pp. 26-28.
Feb. 28, 2017 Office Action issued in Japanese Patent Application No. 2015-206280.

* cited by examiner

*Primary Examiner* — Anthony D Brown
(74) *Attorney, Agent, or Firm* — Oliff PLC

(57) ABSTRACT

A determination apparatus according to an embodiment includes a receiving unit, an acquisition unit, and a determination unit. The receiving unit receives a request for authentication of identity of a user who uses a terminal device. The acquisition unit acquires context information that is information indicating a context of the terminal device. The determination unit performs determination related to authentication requested by the terminal device, on the basis of the context information acquired by the acquisition unit. For example, the determination unit determines whether an authentication procedure for an authentication request received by the receiving unit is needed on the basis of a change between context information that is acquired upon reception of an authentication request by the receiving unit and context information that has been acquired upon reception of a past authentication request.

10 Claims, 13 Drawing Sheets

| USER ID | AUTHENTICA-TION MEANS | CORRECT ANSWER DATA | ... |
|---|---|---|---|
| ... | ... | ... | ... |
| U01 | FINGERPRINT | X01 | ... |
| | PASSWORD | X02 | ... |
| | VOICE | X03 | ... |
| | ... | ... | ... |
| ... | ... | ... | ... |

| USER ID | AUTHENTICATION DATE AND TIME | AUTHENTICATION MEANS | ... |
|---|---|---|---|
| ... | ... | ... | ... |
| U01 | 2015/11/1 7:00 | FINGERPRINT | ... |
| | 2015/11/1 7:10 | REGISTERED DATA | ... |
| | ... | ... | ... |
| | 2015/11/1 9:10 | FINGERPRINT | ... |
| | ... | ... | ... |
| ... | ... | ... | ... |

| USER ID | ACQUISITION DATE AND TIME | CONTEXT INFORMATION | | | | | | |
|---|---|---|---|---|---|---|---|---|
| | | ACQUIRED INFORMATION | RIGHT OR WRONG | ACQUIRED INFORMATION | RIGHT OR WRONG | ACQUIRED INFORMATION | RIGHT OR WRONG | ... |
| ... | ... | ... | ... | ... | ... | ... | ... | ... |
| U01 | 2015/11/1 7:00 | LOCATION INFORMATION G01 | 1 | USER TERMINAL 10/ COMMUNICATION IS PERFORMED | 1 | SPEAKER 20/ COMMUNICATION IS PERFORMED | 1 | ... |
| | 2015/11/1 7:10 | LOCATION INFORMATION G01 | 1 | USER TERMINAL 10/ COMMUNICATION IS PERFORMED | 1 | SPEAKER 20/ COMMUNICATION IS PERFORMED | 1 | ... |
| | 2015/11/1 7:20 | LOCATION INFORMATION G01 | 1 | USER TERMINAL 10/ COMMUNICATION IS PERFORMED | 1 | SPEAKER 20/ COMMUNICATION IS PERFORMED | 1 | ... |
| | ... | ... | ... | ... | ... | ... | ... | ... |
| | 2015/11/1 8:50 | LOCATION INFORMATION G02 | 0 | USER TERMINAL 10/ COMMUNICATION IS PERFORMED | 1 | SPEAKER 20/ COMMUNICATION IS NOT PERFORMED | 0 | ... |
| | 2015/11/1 9:00 | LOCATION INFORMATION G03 | 0 | USER TERMINAL 10/ COMMUNICATION IS PERFORMED | 1 | SPEAKER 20/ COMMUNICATION IS NOT PERFORMED | 0 | ... |
| | 2015/11/1 9:10 | LOCATION INFORMATION G04 | 0 | | | SPEAKER 20/ COMMUNICATION IS NOT PERFORMED | 0 | ... |
| | ... | ... | ... | ... | ... | ... | ... | ... |
| ... | | | | | | | | |

DETERMINATION APPARATUS, DETERMINATION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-206280 filed in Japan on Oct. 20, 2015.

BACKGROUND OF THE INVENTION

1. Field of the Invention

The present invention relates to a determination apparatus, a determination method, and a non-transitory computer readable storage medium having stored therein a determination program.

2. Description of the Related Art

In recent years, communication networks are becoming widespread, and services are actively provided via the networks. For example, a user logs into a service provided via a network by using a communication terminal device, and uses the service. When the user logs into a service or the like, personal authentication on the user who uses the service is needed.

As a technology for the personal authentication in the networks, there is a known technology in which when a terminal is provided with a plurality of authentication methods, an authentication method that uses a sensor appropriate for an environment of the location of the terminal is automatically selected (for example, Japanese Patent Laid-open Publication No. 2015-90589).

However, in the conventional technology, it is difficult to perform personal authentication with good convenience. For example, even in an environment in which a user can select an authentication method from among a plurality of authentication methods, in some cases, the user may need to follow a cumbersome procedure, such as input of an answer or input of biological information, depending on the authentication method. Furthermore, the authentication process itself may be a burden to the user if the user needs to input information at every authentication.

SUMMARY OF THE INVENTION

It is an object of the present invention to at least partially solve the problems in the conventional technology.

A determination apparatus according to the present application includes a receiving unit that receives a request for authentication of identity of a user who uses a terminal device, an acquisition unit that acquires context information that is information indicating a context of the terminal device, and a determination unit that performs determination related to authentication requested by the terminal device, on the basis of the context information acquired by the acquisition unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of an authentication information storage unit according to the first embodiment;

FIG. 6 is a diagram illustrating an example of an authentication log storage unit according to the first embodiment;

FIG. 7 is a diagram illustrating an example of a context log storage unit according to the first embodiment;

DETAILED DESCRIPTION OF THE PREFERRED EMBODIMENTS

Modes (hereinafter, referred to as embodiments) for carrying out a determination apparatus, a determination method, and a non-transitory computer readable storage medium according to the present invention will be described in detail below with reference to the accompanying drawings. The determination apparatus, the determination method, and the non-transitory computer readable storage medium according to the present invention are not limited by the embodiments. Furthermore, the embodiments may be combined appropriately as long as the processing contents do not conflict with each other. In the embodiments below, the same components are denoted by the same symbols, and the same explanation will not be repeated.

1. First Embodiment 1-1. Example of Determination Process

Figure 1:
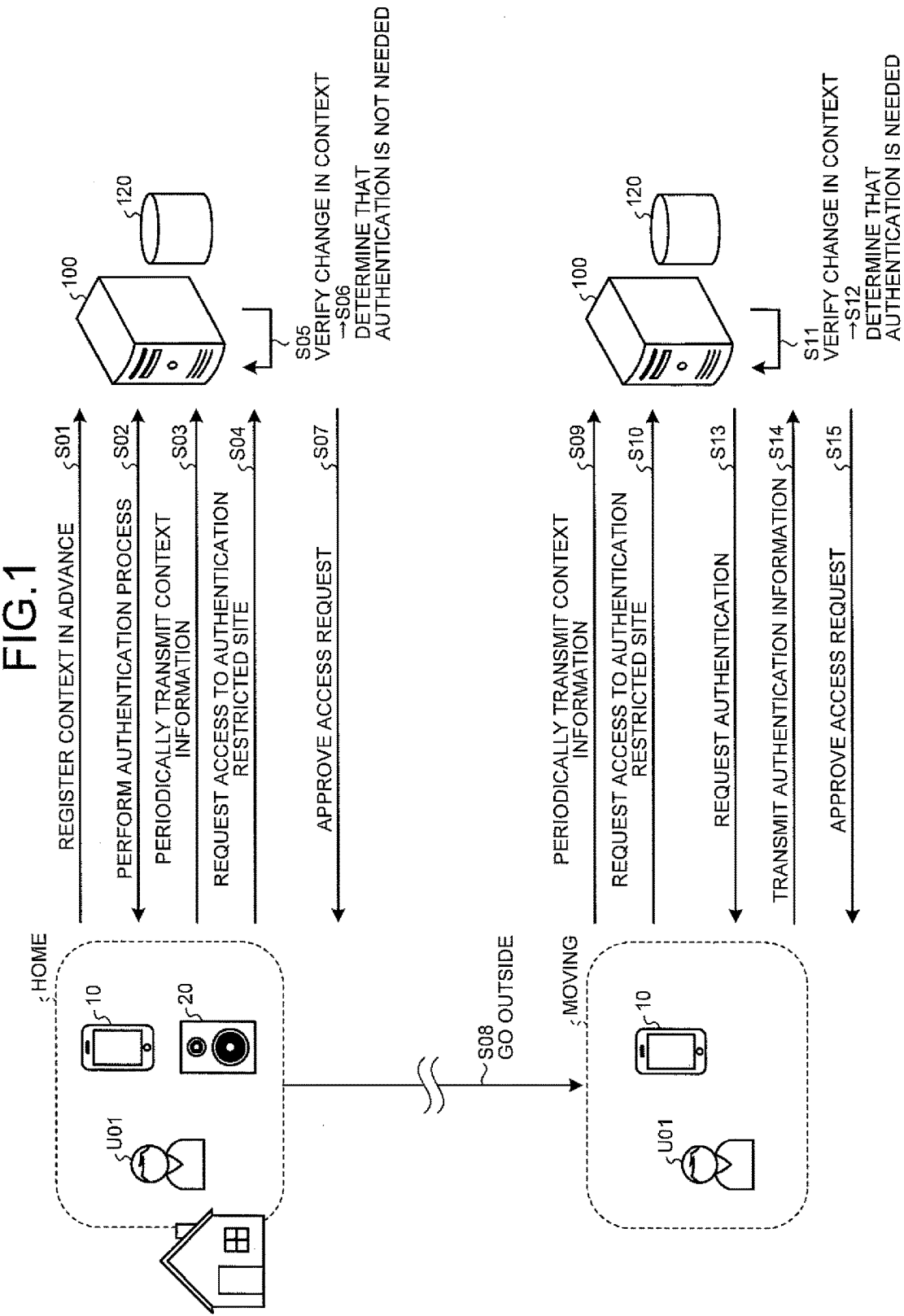
FIG. 1 is a diagram illustrating an example of a determination process according to a first embodiment.

An example of a determination process according to a first embodiment will be described below with reference to FIG. 1. FIG. 1 is a diagram illustrating an example of the determination process according to the first embodiment. In FIG. 1, an example is illustrated in which a determination apparatus 100 of the first embodiment performs a determination process related to an authentication request transmitted by a user terminal 10.

The determination apparatus 100 illustrated in FIG. 1 is a server device that performs determination related to authentication of the user terminal 10. Furthermore, the user terminal 10 is an information processing terminal used by a user U01. In FIG. 1, the user terminal 10 is, for example, a smartphone.

The determination apparatus 100 has a function to receive a request for authentication of the identity of the user U01 who uses the user terminal 10, and to authenticate the user terminal 10 in response to the request. The authentication of the user terminal 10 indicates authentication of the identity of the user U01 through verification that the user terminal 10 is certainly operated by the user U01. For example, when the user terminal 10 attempts to access a service with a predetermined restriction (an access restricted website or the like), the determination apparatus 100 controls the access to the site by performing authentication of the user terminal 10.

The determination apparatus 100 authenticates the user terminal 10 through a predetermined authentication procedure. In the authentication procedure, for example, a series of procedures is performed, which includes reception of information for proving the identity of the user U01 in advance from the user U01 who uses the user terminal 10, and a request from the user terminal 10 to provide information (hereinafter, referred to as "authentication information") for checking match with registered information at the time of authentication. For example, the determination apparatus 100 accepts registration of fingerprint data or a password for authentication from the user U01 in advance. Then, at the time of authentication, the determination apparatus 100 requests the user U01 to transmit fingerprint data or a password as the authentication information. If the registered fingerprint data or the registered password matches the transmitted authentication information, the determination apparatus 100 determines that the identity of the user U01 who uses the user terminal 10 is confirmed, and authenticates the user terminal 10.

However, although the security can be maintained by access restriction, the user U01 needs to perform a cumbersome process such that the user U01 needs to perform an authentication process every time the user U01 accesses a service. Therefore, the determination apparatus 100 according to the first embodiment performs a determination process as described below to reduce time and effort required for the user U01 to perform the authentication process. Hereinafter, an example of the determination process performed by the determination apparatus 100 will be described in accordance with the flow illustrated in FIG. 1. In the example in FIG. 1, it is assumed that the determination apparatus 100 accepts information for confirming the identity of the user U01 (for example, fingerprint data or a password of the user U01) in advance.

First, the determination apparatus 100 accepts, in advance, registration of a context used in the determination process from the user terminal 10 that is an authentication target (Step S01). The determination apparatus 100 stores the accepted context in a storage unit 120. Incidentally, in the first embodiment, the context indicates a situation in which the user terminal 10 is used. Furthermore, in the first embodiment, information for specifying the context is referred to as context information. The context information includes, for example, device information on the user terminal 10 itself, information on an environment in which the user terminal 10 is used by the user U01, information indicating a state of the user U01 who owns the user terminal 10, information on the user U01 and other users related to the user U01, or the like. Incidentally, the context may be registered at the same time of registration of the above-described information for confirming the identity of the user U01.

In the example illustrated in FIG. 1, it is assumed that the user terminal 10 registers, as a context, a combination of three contexts such as "the user terminal 10 is located at home of the user U01", "a communicating state between the user terminal 10 and the determination apparatus 100 is established", and "a communicating state between the user terminal 10 and a speaker 20 is established". Here, it is assumed that the speaker 20 is an audio equipment installed at home of the user U01 and has a predetermined communication function. Specifically, the speaker 20 has a function to establish near field wireless communication with the user terminal 10 and to output, as a sound, a voice signal transmitted from the user terminal 10.

Thereafter, the determination apparatus 100 performs a predetermined authentication process on the user terminal 10 (Step S02). For example, the user terminal 10 accesses a site with a predetermined authentication process (a user login process or the like), and is authenticated by the determination apparatus 100 at the time of the access. In the authentication at Step S02, the determination apparatus 100 receives the authentication information from the user terminal 10, and verifies whether the authentication information matches the registered information to authenticate the user terminal 10.

After the authentication process, the user terminal 10 periodically transmits the context information on the user terminal 10 to the determination apparatus 100 (Step S03). For example, the user terminal 10 transmits, to the determination apparatus 100, environmental information detected by the user terminal 10 or information on a communication state between the determination apparatus 100 and each of the user terminal 10 and the speaker 20 for every one minute. Specifically, the user terminal 10 transmits, as the information on the context registered at Step S01, location information indicating whether "the user terminal 10 is located at home of the user U01", or communication information indicating whether a communicating state between the determination apparatus 100 and each of the user terminal 10 and the speaker 20 is established. The determination apparatus 100 stores the transmitted context information in the storage unit 120.

Thereafter, the user terminal 10 requests an access to an authentication restricted site (Step S04). For example, the user terminal 10 accesses a site different from a site for which the access is permitted through the authentication at Step S02. The request for the access indicates, in other words, an authentication request to request the determination apparatus 100 to authenticate the user terminal 10.

In this case, the determination apparatus 100 refers to the storage unit 120 and verifies a change in the context of the user terminal 10 (Step S05). Specifically, the determination apparatus 100 verifies a change among the context information obtained at the time of the authentication at Step S02, the context information periodically acquired at Step S03, and the context information obtained at the time of the authentication at Step S04.

For example, the determination apparatus 100 determines, on the basis of the context information obtained at the time of the authentication at Step S02, a combination of three contexts such as "the user terminal 10 is located at home of the user U01", "a communicating state between the user terminal 10 and the determination apparatus 100 is established", and "a communicating state between the user terminal 10 and the speaker 20 is established" is established as the context of the user terminal 10. Furthermore, the determination apparatus 100 determines that the above-described combination of the three contexts is established at Step S03 and Step S04.

If the determination apparatus 100 determines that each piece of the context information is not changed, that is, if the context registered in advance is established even at Step S04, the determination apparatus 100 determines that the user terminal 10 is continuously operated by the user U01 from the time of Step S02. Therefore, the determination apparatus 100 determines that new authentication is not needed at Step S04 (Step S06). In other words, in the authentication at Step S04, the determination apparatus 100 authenticates the user terminal 10 while omitting an authentication procedure. Then, the determination apparatus 100 approves the access request provided at Step S04 (Step S07).

Subsequently, the user U01 goes out from his/her home (Step S08). Even in this case, the user terminal 10 continues to periodically transmit the context information to the determination apparatus 100 (Step S09).

Then, the user terminal 10 requests an access to an authentication restricted site in a place where the user terminal 10 is located (Step S10). When receiving the access request from the user terminal 10, the determination apparatus 100 verifies a change in the context of the user terminal 10 (Step S11). Specifically, the determination apparatus 100 examines a change among the context information obtained at Steps S02 to S07, the context information periodically acquired at Step S09, and the context information obtained at the time of authentication at Step S10.

Then, the determination apparatus 100 determines that there is a change between the context information obtained at Steps S02 to S09 and the context information obtained at the time of authentication at Step S10. Specifically, at Step S10, the determination apparatus 100 determines that the context of the user terminal 10 has changed because the user terminal 10 does not transmit information indicating the contexts such as "the user terminal 10 is located at home of the user U01" and "a communicating state between the user terminal 10 and the speaker 20 is established" among the contexts registered at Step S01 although the user terminal 10 continuously transmits information indicating the context such as "a communicating state between the user terminal 10 and the determination apparatus 100 is established".

Then, the determination apparatus 100 determines that new authentication is needed in response to the request provided at Step S10 (Step S12). That is, the determination apparatus 100 is not able to confirm that the user terminal 10 is continuously operated by the user U01 because the context of the user terminal 10 has changed, and therefore, the determination apparatus 100 determines that it is necessary to perform authentication again to authenticate the user terminal 10, and requests the authentication (Step S13).

In this case, the determination apparatus 100 requests a normal authentication procedure in response to the access request transmitted from the user terminal 10. That is, the determination apparatus 100 requests the user terminal 10 to transmit authentication information that is information for confirming the identity of the user U01. In response to the request, the user terminal 10 transmits the authentication information (Step S14). The determination apparatus 100 determines match of the authentication information and authenticates the user terminal 10. That is, the determination apparatus 100 approves the access request provided at Step S10 (Step S15).

As described above, the determination apparatus 100 according to the first embodiment receives a request for authentication of the identity of the user U01 who uses the user terminal 10, and acquires the context information that is information indicating the context of the user terminal 10. Then, the determination apparatus 100 performs determination related to authentication requested by the user terminal 10, on the basis of the acquired context information. For example, the determination apparatus 100 determines whether to request the user terminal 10 that was authenticated in the past to perform an authentication procedure again.

That is, the determination apparatus 100 determines whether to perform an authentication procedure on the basis of the context of the user terminal 10 that is an authentication target. For example, if the context accepted in advance from the user terminal 10 is not different from the context obtained at the time of authentication, the determination apparatus 100 determines that a new authentication procedure is not needed. Therefore, the determination apparatus 100 can authenticate the user terminal 10 while omitting the new authentication procedure. In this manner, according to the determination apparatus 100, the user U01 can implement the authentication without being requested to perform the authentication procedure, such as input of a password, when a certain degree of reliability is ensured from the context. Therefore, the user U01 can reduce time and effort on the authentication by registering, in advance, a context or the like that is likely to be realized in his/her daily life. As a result, the determination apparatus 100 can perform personal authentication with good convenience.

1-2. Configuration of Determination Processing System

Figure 2:
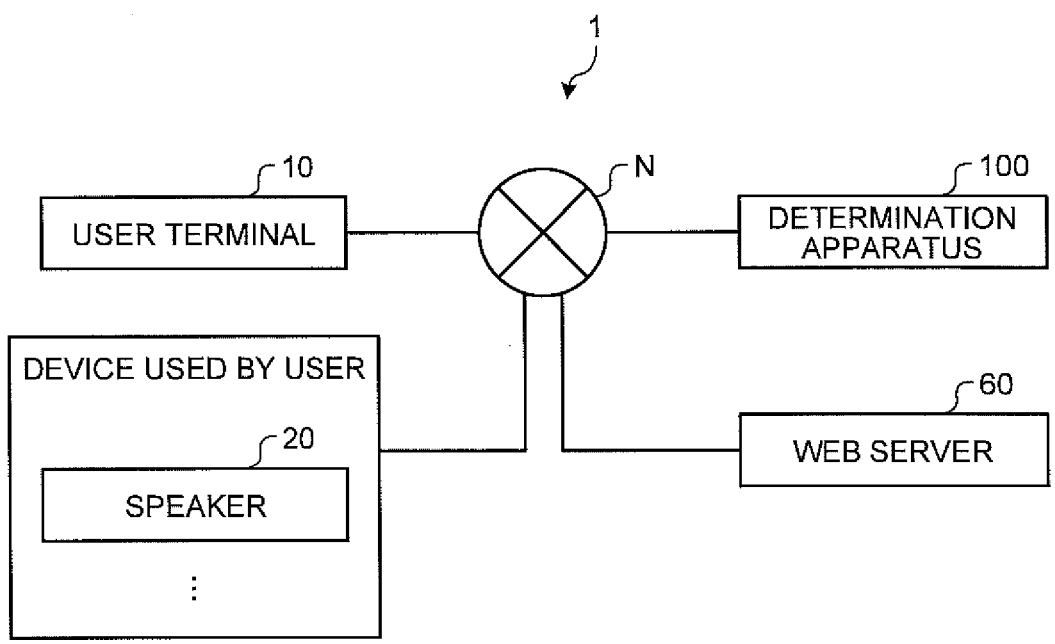
FIG. 2 is a diagram illustrating a configuration example of a determination processing system according to the first embodiment.

Next, a configuration of a determination processing system 1 including the determination apparatus 100 according to the first embodiment will be described with reference to FIG. 2. FIG. 2 is a diagram illustrating a configuration example of the determination processing system 1 according to the first embodiment. As illustrated in FIG. 2, the determination processing system 1 according to the first embodiment includes the user terminal 10, a device used by a user, the determination apparatus 100, and a web server 60. As illustrated in FIG. 2, the device used by the user includes the speaker 20 and the like. These various devices are communicably connected to one another by wire or wireless via a network N.

The user terminal 10 is an information processing terminal, such as a desktop personal computer (PC), a notebook PC, a tablet terminal, a mobile phone including a smartphone, or a personal digital assistant (PDA). The user terminal 10 also includes a wearable device such as an eyeglass-type information processing terminal (smart glasses) or a watch-type information processing terminal (smartwatch). The user terminal 10 may also include various smart devices with information processing functions. For example, the user terminal 10 may include a smart home appliance, such as a television (TV), a refrigerator, or a cleaner, a smart vehicle, such as a car, a drone, or a home robot.

The user terminal 10 acquires the context information indicating the context of the user terminal 10 in accordance with an operation performed by the user or a function of the user terminal 10. For example, the user terminal 10 acquires, as the context information, various physical quantities, such as a position, acceleration, temperature, gravity, rotation (angular velocity), illuminance, geomagnetism, pressure, proximity, humidity, or a rotation vector, by using various built-in sensors. Furthermore, the user terminal 10 acquires the context information, such as connection status with various devices, by using a built-in communication function.

The device used by the user is an inclusive term of devices that are used by the user in addition to the user terminal 10. For example, the device used by the user may be various smart devices with information processing functions, similarly to the above-described user terminal 10. In the first embodiment, the device used by the user is, for example, the speaker 20. These devices are used to, for example, represent the context of the user terminal 10.

The determination apparatus 100 is a server device that acquires the context information on the user terminal 10 and performs determination related to authentication of the user terminal 10 on the basis of the acquired context information as described above.

The web server 60 is a server device that provides various web pages when accessed by the user terminal 10. The web server 60 provides, for example, various web pages related to a news site, a weather forecast site, a shopping site, a finance (stock price) site, a route search site, a map site, a travel site, a restaurant introduction site, or a weblog, or provides a content displayed on an application or the like.

When providing a service, the web server 60 may request authentication of the identity of a user. For example, if it is not possible to authenticate that a user using the user terminal 10 is reliably the user U01 when the web server 60 provides a payment service, the web server 60 can restrict the user terminal 10 from executing the payment service. The web server 60 determines whether to permit an access from the user terminal 10 in accordance with an authentication result obtained by the determination apparatus 100 that performs authentication related to the user terminal 10. For example, if the determination apparatus 100 authenticates the user terminal 10, the web server 60 permits the user terminal 10 to access an authentication restricted site.

That is, when receiving, from the determination apparatus 100, information indicating that the determination apparatus 100 has authenticated the user U01, the web server 60 believes that the user using the user terminal 10 is the user U01. After authentication of the user terminal 10, the web server 60 can accept an operation, such as a payment process performed by the user terminal 10, that is permitted only after the identity is authenticated.

1-3. Configuration of Determination Apparatus

Figure 3:
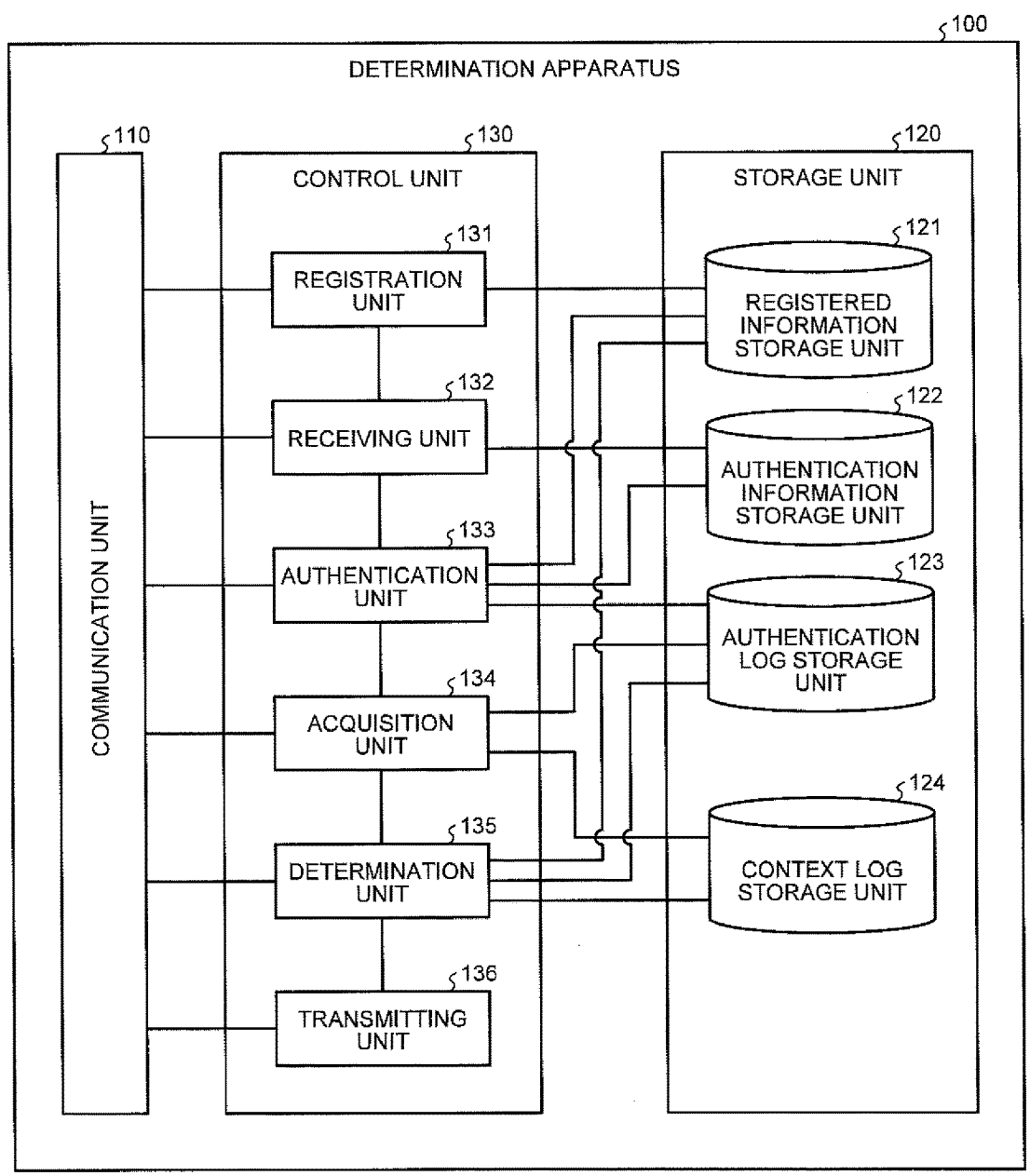
FIG. 3 is a diagram illustrating a configuration example of a determination apparatus according to the first embodiment.

Next, a configuration of the determination apparatus 100 according to the first embodiment will be described with reference to FIG. 3. FIG. 3 is a diagram illustrating a configuration example of the determination apparatus 100 according to the first embodiment. As illustrated in FIG. 3, the determination apparatus 100 includes a communication unit 110, the storage unit 120, and a control unit 130. The determination apparatus 100 may include an input unit (for example, a keyboard, a mouse, or the like) that accepts various operations from an administrator or the like who uses the determination apparatus 100, or a display unit (for example, a liquid crystal display or the like) that displays various kinds of information.

Communication Unit 110

The communication unit 110 is implemented by, for example, a network interface card (NIC) or the like. The communication unit 110 is connected to the network N by wire or wireless, and transmits and receives information to and from the user terminal 10 or the like via the network N.

Storage Unit 120

The storage unit 120 is implemented by, for example, a semiconductor memory device, such as a random access memory (RAM) or a flash memory, or a storage device, such as a hard disk or an optical disk. The storage unit 120 includes a registered information storage unit 121, an authentication information storage unit 122, an authentication log storage unit 123, and a context log storage unit 124.

Registered Information Storage Unit 121

Figure 4:
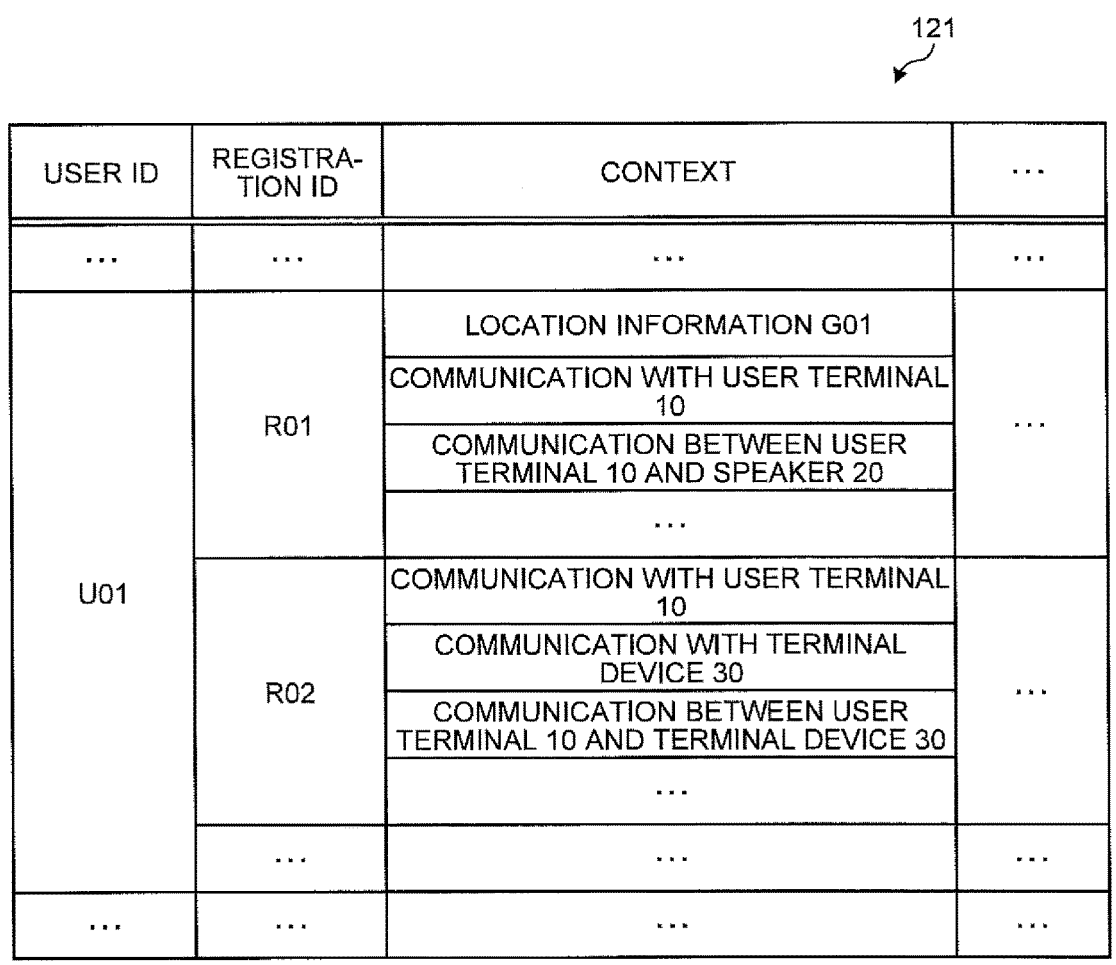
FIG. 4 is a diagram illustrating an example of a registered information storage unit according to the first embodiment.

The registered information storage unit 121 stores therein information on registered information that is registered by the user terminal 10. An example of the registered information storage unit 121 according to the first embodiment is illustrated in FIG. 4. FIG. 4 is a diagram illustrating the example of the registered information storage unit 121 according to the first embodiment. In the example illustrated in FIG. 4, the registered information storage unit 121 has items such as a "user ID", a "registration ID", and a "context".

The "user ID" is identification information for identifying a user who registers a context. It is assumed that the user ID matches a reference symbol of a user who operates the user terminal 10. For example, a user identified by a user ID "U01" indicates the user U01. The user ID may be handled as information for identifying a terminal device used by the user identified by the user ID.

The "registration ID" is information for identifying a registered context. The "context" is a context that is registered in advance by a user, and indicates a context used in the above-described determination process. For example, the context is specified by location information indicating a location of the user terminal 10, or communication information indicating that the user terminal 10 and the determination apparatus 100 are in a communicating state.

Specifically, in FIG. 4, it is indicated that the user U01 identified by the user ID "U01" has registered, as a context identified by a registration ID "R01", contexts such as "location information G01", "communication with the user terminal 10", "communication between the user terminal 10 and the speaker 20".

Incidentally, in the example in FIG. 4, a case is illustrated in which the "location information" indicates location information on the user terminal 10 and conceptual information such as "G01" is stored as a value indicated by the "location information". However, in reality, information indicating "latitude and longitude", an "address (for example, a prefecture or a municipality)", or the like is stored as the location information. For example, it is assumed that the location information G01 is location information indicating home of the user U01. The user terminal 10 acquires, as the context information, the location information by using a global positioning system (GPS) or the like, for example.

Furthermore, the "communication" may be not only a wide area network, such as the Internet, but also near field communication (for example, communication established by Bluetooth (registered trademark) or the like) that is established only between the user terminal 10 and the speaker 20 without through an external network equipment or the like.

Authentication Information Storage Unit 122

The authentication information storage unit 122 stores therein information on authentication performed by the determination apparatus 100. An example of the authentication information storage unit 122 according to the first embodiment is illustrated in FIG. 5. FIG. 5 is a diagram illustrating the example of the authentication information storage unit 122 according to the first embodiment. In the example illustrated in FIG. 5, the authentication information storage unit 122 has items such as a "user ID", an "authentication means", and "correct answer data".

The "user ID" corresponds to the same item illustrated in FIG. 4. The "authentication means" indicates a means for authentication used to authenticate a user. For example, a fingerprint, a password, a voice, an iris, face recognition, or the like may be used as the authentication means. The "correct answer data" indicates correct answer data that is used to authenticate the identity of the user in accordance with the authentication means. In FIG. 5, an example is illustrated in which conceptual information such as "X01" is stored as a value indicated by the "correct answer data". However, in reality, fingerprint data, a character string used as a password, voiceprint information on a voice, or the like of the user is stored as the correct answer data.

Specifically, in FIG. 5, an example is illustrated in which the user U01, who is a user to be authenticated by the determination apparatus 100 and identified by the user ID "U01", registers a "fingerprint", a "password", and a "voice" as the authentication means, and pieces of correct answer data for the respective authentication means are "X01", "X02", and "X03". Incidentally, while not illustrated in FIG. 5, the user U01 may register the authentication means for each site to be used, for example. For example, the user U01 may perform setting such that a "fingerprint" is used as the authentication information when authentication for a bank site is performed, and a "password" is used as the authentication information when authentication for other sites is performed. In this case, the determination apparatus 100 stores the setting in the authentication information storage unit 122.

Authentication Log Storage Unit 123

The authentication log storage unit 123 stores therein a log related to authentication performed by the determination apparatus 100. An example of the authentication log storage unit 123 according to the first embodiment is illustrated in FIG. 6. FIG. 6 is a diagram illustrating the example of the authentication log storage unit 123 according to the first embodiment. In the example illustrated in FIG. 6, the authentication log storage unit 123 has items such as a "user ID", an "authentication date and time", and an "authentication means".

The "user ID" corresponds to the same item illustrated in FIG. 4. The "authentication date and time" indicates a date and time at which authentication is performed. The "authentication means" indicates an authentication means used for the authentication.

Specifically, in FIG. 6, it is indicated that authentication is performed on the user U01 identified by the user ID "U01" by using a "fingerprint" as the authentication means on "Nov. 1, 2015, at 7:00". Furthermore, it is indicated that authentication is performed by using "registered data" as the authentication means on "Nov. 1, 2015, at 7:10". The "registered data" indicates a context registered in the registered information storage unit 121. That is, an example is illustrated in which, at the time of the authentication performed on "Nov. 1, 2015, at 7:10", authentication according to a normal authentication procedure is skipped and the user U01 is authenticated by using the registered context.

Incidentally, the context information on the user terminal 10 at the time of authentication may be stored in the authentication log storage unit 123, in association with information on the authentication.

Context Log Storage Unit 124

The context log storage unit 124 stores therein a log related to a context acquired by the determination apparatus 100. An example of the context log storage unit 124 according to the first embodiment is illustrated in FIG. 7. FIG. 7 is a diagram illustrating the example of the context log storage unit 124 according to the first embodiment. In the example illustrated in FIG. 7, the context log storage unit 124 has items such as a "user ID", an "acquisition date and time", and "context information".

The "user ID" corresponds to the same item illustrated in FIG. 4. The "acquisition date and time" indicates a date and time at which the context information is acquired.

The "context information" indicates various kinds of information for indicating a context of a terminal device used by a user. The context information is information indicating the usage of the terminal device, and therefore includes various kinds of information. In the example illustrated in FIG. 7, it is assumed that the context log storage unit 124 stores therein information indicating whether a registered context is acquired with respect to a context that is registered in advance by a user. Specifically, in FIG. 7, an example is illustrated in which a log of the context information on a context indicated by a registration ID "R01" is stored among pieces of the registered information illustrated in FIG. 4.

For example, the context information includes sub items such as "acquired information" and "right or wrong". The "acquired information" corresponds to the context information related to the context indicated by the registration ID "R01". For example, in the example illustrated in FIG. 7, right or wrong about whether the "location information G01" is acquired as the acquired information is stored. Similarly, right or wrong about whether "communication between the user terminal 10 (and the determination apparatus 100)" or "communication between the speaker 20 (and the user terminal 10)" is acquired as the acquired information is stored.

For example, in FIG. 7, the "location information G01" is acquired as the context information on "Nov. 1, 2015, at 7:00", so that "right (1)" is stored as "right or wrong". Similarly, "communication is performed" is acquired for the "user terminal 10", so that "right (1)" is stored as "right or wrong". Similarly, "communication is performed" is acquired for the "speaker 20", so that "right (1)" is stored as "right or wrong".

In contrast, "location information G03" is acquired as the context information on "Nov. 1, 2015, at 9:00", which is different from the "location information G01" indicating the registered context. Therefore, "wrong (0)" is stored as "right or wrong". Similarly, "communication is not performed" is acquired for the "speaker 20", so that "wrong (0)" is stored as "right or wrong". This means that the user U01 has gone out from home (which is indicated by the location information G01) and communication between the user terminal 10 and the speaker 20 is disconnected. Incidentally, the "user terminal 10" continuously maintains communication with the determination apparatus 100, so that "communication is performed" is acquired and "right (1)" is stored as "right or wrong".

As described above, the context log storage unit 124 stores therein the context information indicating the context of the user terminal 10, and stores therein, as a log, information indicating whether the registered context is satisfied. In the example illustrated in FIG. 7, the information on the context indicated by the registration ID "R01" is illustrated by way of example. However, it is assumed that the context log storage unit 124 simultaneously stores therein information on a context indicated by a registration ID "R02".

Control Unit 130

The control unit 130 is implemented by, for example, executing various programs stored in an internal storage device of the determination apparatus 100 by a central processing unit (CPU), a micro processing unit (MPU), or the like by using a RAM as a work area. Furthermore, the control unit 130 may be implemented by, for example, an integrated circuit, such as an application specific integrated circuit (ASIC) or a field programmable gate array (FPGA).

As illustrated in FIG. 3, the control unit 130 includes a registration unit 131, a receiving unit 132, an authentication unit 133, an acquisition unit 134, a determination unit 135, and a transmitting unit 136, and implements or executes functions and operations of information processing as described below. Incidentally, the internal configuration of the control unit 130 is not limited to the configuration as illustrated FIG. 3, and any other configurations that perform the information processing as described below are applicable. Furthermore, a connection relation between processing units of the control unit 130 is not limited to the connection relation as illustrated in FIG. 3, and any other connection relations are applicable.

Registration Unit 131

The registration unit 131 accepts registration of the context of the user terminal 10 when the user terminal 10 is authenticated. For example, the registration unit 131 accepts, in advance, registration of a context that is frequently observed at the time of authentication from the user U01 who uses the user terminal 10. The context accepted by the registration unit 131 is used in a determination process performed by the determination unit 135, and an authentication procedure required for the user terminal 10 is skipped under a predetermined condition. As described above, the registration unit 131 registers the context in advance, and therefore can improve the convenience of the authentication process.

The registration unit 131 stores the accepted context in the registered information storage unit 121. Furthermore, the registration unit 131 may accept a change or update of the registered context from the user who has already registered the context.

Receiving Unit 132

The receiving unit 132 receives various kinds of information. For example, the receiving unit 132 receives various requests transmitted from the user terminal 10. Specifically, the receiving unit 132 receives a request for an access to a predetermined restricted site from the user terminal 10. Furthermore, the receiving unit 132 receives a request for authentication of the user terminal 10. Moreover, the receiving unit 132 receives the authentication information transmitted from the user terminal 10 in an authentication procedure.

In the above-described process, the receiving unit 132 may receive a request for an access to a predetermined restricted site or a request for authentication of the user terminal 10 via the web server 60. That is, when the user terminal 10 accesses a site managed by the web server 60, the web server 60 transmits, to the determination apparatus 100, a notice indicating that there is an access request or there is a need for authentication of the user terminal 10 to permit the access. The receiving unit 132 receives the request transmitted from the web server 60, and appropriately sends information on the received request to each of the processing units of the control unit 130.

Furthermore, the receiving unit 132 receives an authentication means used for authentication or receives correct answer data corresponding to the authentication means. The receiving unit 132 stores the received information in the authentication information storage unit 122.

Authentication Unit 133

The authentication unit 133 authenticates the identity of the user U01 who uses the user terminal 10. Specifically, the authentication unit 133 performs an authentication procedure on the user terminal 10 that is an authentication target, on the basis of the information stored in the authentication information storage unit 122. That is, the authentication unit 133 accepts the authentication information from the user terminal 10, and verifies whether the accepted authentication information matches the correct answer data. If the authentication unit 133 verifies that the accepted authentication information matches the correct answer data, the authentication unit 133 determines that the identity of the user U01 who uses the user terminal 10 is confirmed, and authenticates the user terminal 10.

For example, the authentication unit 133 performs the authentication process on the user terminal 10 when the user terminal 10 accesses a restricted site to use a predetermined service or when the user terminal 10 performs a login process to use a service.

Furthermore, if the determination unit 135 performs determination as will be described later, the authentication unit 133 determines whether to perform an authentication procedure in accordance with the determination performed by the determination unit 135. Specifically, if the determination unit 135 determines that an authentication procedure for an authentication request is needed, the authentication unit 133 performs the authentication procedure on the user terminal 10. In contrast, if the determination unit 135 determines that the authentication procedure for the authentication request is not needed, the authentication unit 133 authenticates the user terminal 10 while omitting the authentication procedure. In this case, the authentication unit 133 authenticates the user terminal 10 based on the context of the user terminal 10, rather than based on the authentication information transmitted from the user terminal 10.

Acquisition Unit 134

The acquisition unit 134 acquires various kinds of information. For example, the acquisition unit 134 acquires the context information indicating the context of the user terminal 10. Specifically, the acquisition unit 134 acquires, as the context information, environmental information detected by the user terminal 10, device information on the user terminal 10 itself, user information on the user U01 who uses the user terminal 10, information on an external apparatus that communicates with the user terminal 10, or the like.

For example, the acquisition unit 134 acquires, as the context information detected by the user terminal 10, location information indicating a location of the user terminal 10, temperature around the user terminal 10, humidity information, optical information indicating the intensity of environmental light, sound information indicating a noise level around the user terminal 10, or the like. Furthermore, the acquisition unit 134 may acquire environmental information around the user terminal 10 on the basis of a photograph or an image captured by a camera included in the user terminal 10. For example, the acquisition unit 134 acquires the environmental information around the user terminal 10 on the basis of image information captured by the camera, location information included in the image information, a date and time of capturing, or the like.

Furthermore, the acquisition unit 134 acquires, as the device information on the user terminal 10 itself, information on a CPU, an operating system (OS), a memory, or the like of the user terminal 10, information on a network function of an antenna or the like, information on an installed software, information on browser software to be used, information on a corresponding authentication means (for example, whether a function to acquire fingerprint data or a function to acquire an iris is provided), or the like.

Moreover, the acquisition unit 134 may acquire an operating condition of the user terminal 10. For example, the acquisition unit 134 acquires information on whether the user terminal 10 is in an activated state, and when the user terminal 10 is in the activated state, the acquisition unit 134 acquires information on an ON/OFF state of a screen, information on whether the user terminal 10 is in a moving state or a resting state, or the like. The information is acquired by, for example, an application having a predetermined sensing function installed in the user terminal 10, and stored inside the user terminal 10.

Furthermore, the acquisition unit 134 acquires, as the information on a user for whom the context information is to be acquired or as information on other users related to the user, attribute information on the users, information on a current behavior, an action history on the network, interests and concerns, information on relationships with other users (they are present physically close to each other, belonging to the same organization, having social connections, or the like), or the like. The user information is acquired by, for example, referring to a browser log or the like stored in the user terminal 10.

Moreover, the acquisition unit 134 acquires, as the information on an external apparatus that communicates with the user terminal 10, information for identifying the external apparatus communicating with the user terminal 10, a type or a frequency band of the established communication, or the like.

The acquisition unit 134 acquires the above-described information by periodically accepting the context information from the user terminal 10. Furthermore, the acquisition unit 134 may acquire the context information not by the transmission from the user terminal 10, but by performing predetermined communication with the user terminal 10 or the like at predetermined time intervals and by crawling the context information stored inside the user terminal 10. The acquisition unit 134 stores the acquired information in the authentication log storage unit 123 or the context log storage unit 124.

Determination Unit 135

The determination unit 135 performs determination related to authentication requested by the user terminal 10, on the basis of the context information acquired by the acquisition unit 134. For example, the determination unit 135 determines whether it is necessary to perform an authentication procedure for the authentication request received by the receiving unit 132, on the basis of a change between the context information that is acquired upon reception of the authentication request by the receiving unit 132 and the context information that has been acquired upon reception of a past authentication request. More specifically, the determination unit 135 determines whether it is necessary to perform an authentication procedure for the current request, on the basis of a change between the context information that has been acquired at the previous authentication request and the context information that is acquired at the current authentication request.

The determination unit 135 verifies whether the presence of the context information itself is changed or a value indicated by the context information is changed as a change in the context information. A change in the presence of the context information means that, for example, the context information such as "communication between the user terminal 10 and the speaker 20 is established" is not observed from a certain time point, that is, "presence or absence" of the context information is changed. Furthermore, a change in the value indicated by the context information means that, for example, the context information such as "location information on the user terminal 10 is G01" is changed to the context information such as "location information on the user terminal 10 is G02" from a certain time point.

The determination unit 135 sets a predetermined threshold for a change in the presence or for the value of the context information, and determines a change in the context information on the user terminal 10. That is, the determination unit 135 determines whether it is necessary to perform an authentication procedure in response to the current authentication request, on the basis of a change rate or a change amount of the context information.

For example, the determination unit 135 performs determination on a few kinds of context information that have been acquired at the time of previous authentication. In this case, the determination unit 135 determines a change amount indicating how many kinds of context information among the few kinds of the context information have changed their presence. Furthermore, if the context information is information indicating a value, the determination unit 135 determines a change rate indicating the rate of change in the value. For example, if only one kind of context information has been changed among the few kinds of the context information serving as determination targets, the determination unit 135 may determine that there is no change in the context of the user terminal 10. Furthermore, even when the acquired location information G01 is changed to the location information G02, if the location information G01 and the location information G02 indicate very close areas, the determination unit 135 may determine that there is no change in the context of the user terminal 10. Incidentally, a threshold for the change amount or the change rate for determining that the context information is changed may be set appropriately through, for example, a well-known learning process including repetition of processes, or may be set manually by an administrator or the like of the determination apparatus 100.

When determining that the context information is changed beyond the predetermined threshold, the determination unit 135 determines that a new authentication procedure on the user terminal 10 is needed. In contrast, when determining that the context information is not changed beyond the predetermined threshold, the determination unit 135 determines that a new authentication procedure on the user terminal 10 is not needed.

Furthermore, the determination unit 135 may determine whether it is necessary to perform an authentication procedure for the current authentication request, on the basis of a pattern of a change in the context information, where the pattern is acquired during a time between the previous authentication request and the current authentication request. For example, the determination unit 135 refers to a context log that is periodically acquired by the acquisition unit 134. Then, the determination unit 135 determines whether a new authentication procedure is needed in accordance with a change pattern of the context log. For example, even when the context information indicating that communication between the user terminal 10 and the speaker 20 is repeatedly connected and disconnected is acquired, if only such a change is repeated and the context of the user terminal 10 is not greatly changed during a time between the previous authentication and the current authentication, the determination unit 135 may determine that a new authentication procedure is not needed. In contrast, even when the context information acquired at the time of the previous authentication request matches the context information acquired at the time of the current authentication request, if a change pattern different from a normally-observed change is observed in the context log that is periodically acquired during a time between the previous and current authentication requests, the determination unit 135 may determine that a new authentication procedure on the user terminal 10 is needed in the current authentication.

Furthermore, the determination unit 135 may perform determination on the basis of the context registered in advance as described above. That is, if the context information acquired when the receiving unit 132 receives the authentication request indicates a context that is already registered by the registration unit 131, the determination unit 135 may determine that an authentication procedure for the authentication request is not needed.

Transmitting Unit 136

The transmitting unit 136 transmits various kinds of information. For example, the transmitting unit 136 transmits a result of an authentication process performed by the authentication unit 133 to the user terminal 10 that has requested authentication. For example, if the authentication unit 133 authenticates the user terminal 10, the transmitting unit 136 transmits, to the user terminal 10, information indicating that the authentication is successful and a connection to a predetermined site is permitted.

1-4. Configuration of User Terminal

Figure 8:
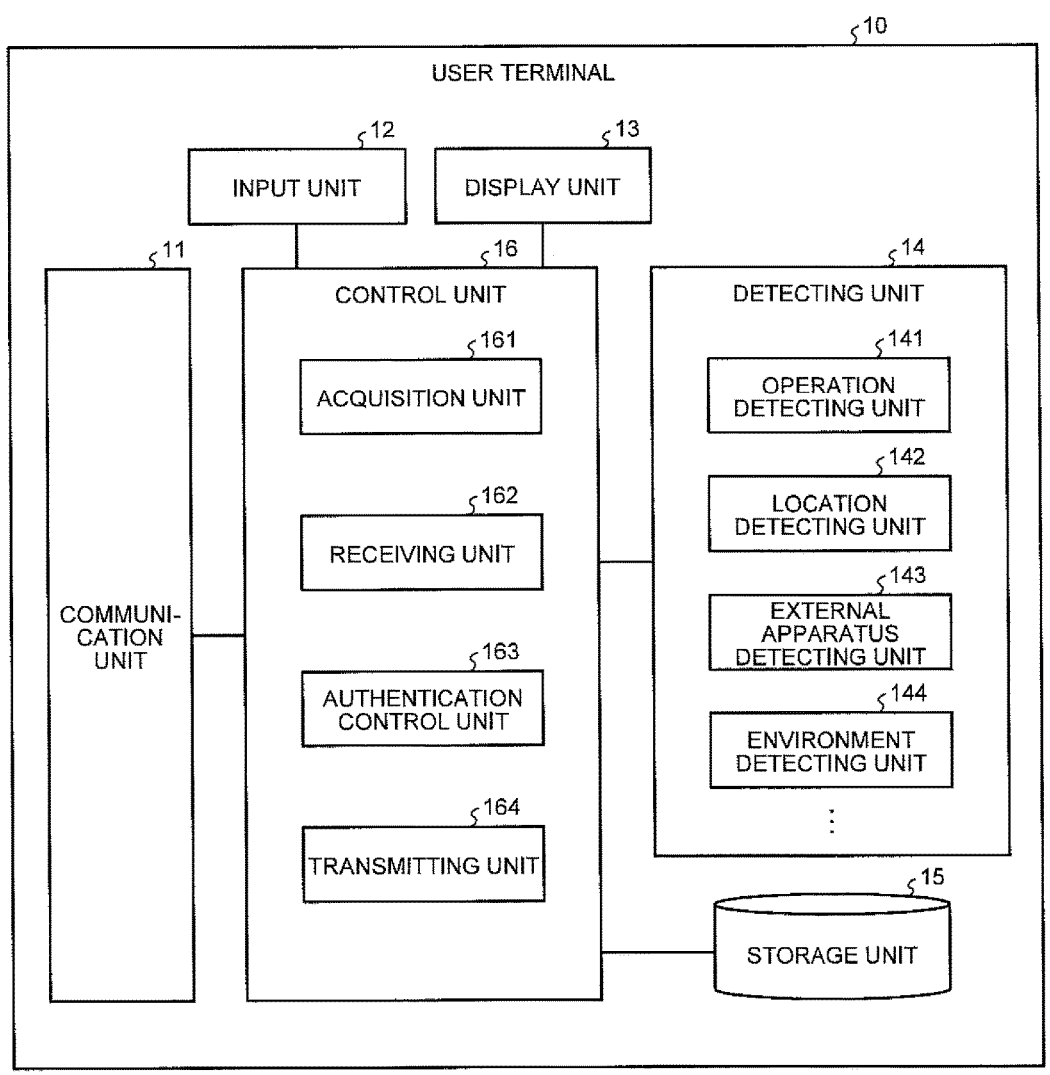
FIG. 8 is a diagram illustrating a configuration example of a user terminal according to the first embodiment.

Next, a configuration of the user terminal 10 according to the first embodiment will be described with reference to FIG. 8. FIG. 8 is a diagram illustrating a configuration example of the user terminal 10 according to the first embodiment. As illustrated in FIG. 8, the user terminal 10 includes a communication unit 11, an input unit 12, a display unit 13, a detecting unit 14, a storage unit 15, and a control unit 16.

Communication Unit 11

The communication unit 11 is connected to the network N by wire or wireless, and transmits and receives information to and from the speaker 20, the determination apparatus 100, and the web server 60. For example, the communication unit 11 is implemented by a NIC or the like.

Input Unit 12 and Display Unit 13

The input unit 12 is an input device that accepts various operations from a user. For example, the input unit 12 is implemented by an operation key or the like provided in the user terminal 10. The display unit 13 is a display device for displaying various kinds of information. For example, the display unit 13 is implemented by a liquid crystal display or the like. If a touch panel is employed as the user terminal 10, a part of the input unit 12 and the display unit 13 are integrated.

Detecting Unit 14

The detecting unit 14 detects various kinds of information on the user terminal 10. Specifically, the detecting unit 14 detects an operation that is performed on the user terminal 10 by the user U01, location information indicating a location of the user terminal 10, information on an apparatus connected to the user terminal 10, an environment in the user terminal 10, or the like. In the example illustrated in FIG. 8, the detecting unit 14 includes an operation detecting unit 141, a location detecting unit 142, an external apparatus detecting unit 143, and an environment detecting unit 144.

Operation Detecting Unit 141

The operation detecting unit 141 detects an operation that is performed on the user terminal 10 by the user U01. For example, the operation detecting unit 141 detects an operation performed by the user U01, on the basis of information input to the input unit 12. That is, the operation detecting unit 141 detects that an operation of touching a screen is input to the input unit 12, or detects that a voice is input. Furthermore, the operation detecting unit 141 may detect that the user U01 has activated a predetermined application. If the application is an application that causes an imaging device in the user terminal 10 to operate, the operation detecting unit 141 detects that the user U01 is using an imaging function. Moreover, the operation detecting unit 141 may detect an operation of moving the user terminal 10 itself, on the basis of data detected by an acceleration sensor or a gyro sensor included in the user terminal 10.

Location Detecting Unit 142

The location detecting unit 142 detects a current location of the user terminal 10. Specifically, the location detecting unit 142 receives radio waves sent from a GPS satellite, and acquires location information (for example, latitude and longitude) indicating the current location of the user terminal 10 on the basis of the received radio waves.

The location detecting unit 142 can acquire the location information by various methods. For example, if the user terminal 10 has the same function as a contactless IC card used at entrance gates in stations, shopping areas, or the like (or if the user terminal 10 has a function to read a history of a contactless IC card), the user terminal 10 records a used location as well as information on payment or the like of a fare at a station. The location detecting unit 142 detects the above-described information and uses the detected information as the location information. Furthermore, when the user terminal 10 performs communication with a specific access point, the location detecting unit 142 may detect location information that can be acquired from the access point. Moreover, the location information may be acquired by an optical sensor, an infrared sensor, a magnetic sensor, or the like included in the user terminal 10.

External Apparatus Detecting Unit 143

The external apparatus detecting unit 143 detects an external apparatus connected to the user terminal 10. For example, the external apparatus detecting unit 143 detects an external apparatus on the basis of exchange of communication packets with the external apparatus. Then, the external apparatus detecting unit 143 recognizes the detected external apparatus as a terminal connected to the user terminal 10. Furthermore, the external apparatus detecting unit 143 may detect a type of a connection with the external apparatus. For example, the external apparatus detecting unit 143 detects whether the external apparatus is connected by wire or by wireless communication. Moreover, the external apparatus detecting unit 143 may detect a communication method or the like used in wireless communication. Furthermore, the external apparatus detecting unit 143 may detect an external apparatus on the basis of information acquired by a radio wave sensor that detects radio waves emitted by the external apparatus, an electromagnetic wave sensor that detects electromagnetic waves, or the like.

Environment Detecting Unit 144

The environment detecting unit 144 detects an environment in the user terminal 10. The environment detecting unit 144 detects information on the environment by using various sensors or functions provided in the user terminal 10. For example, the environment detecting unit 144 uses a microphone that collects sounds around the user terminal 10, an illuminance sensor that detects illuminance around the user terminal 10, an acceleration sensor (or a gyro sensor or the like) that detects physical movement of the user terminal 10, a humidity sensor that detects humidity around the user terminal 10, a geomagnetism sensor that detects a magnetic field at the location of the user terminal 10, or the like. The environment detecting unit 144 detects various kinds of information by using various sensors. For example, the environment detecting unit 144 detects a noise level around the user terminal 10, or whether the illuminance around the user terminal 10 is appropriate for capturing an iris image of the user U01. Furthermore, the environment detecting unit 144 may detect surrounding environmental information based on a photograph or an image captured by a camera.

Storage Unit 15

The storage unit 15 stores therein various kinds of information. The storage unit 15 is implemented by, for example, a semiconductor memory device, such as a RAM or a flash memory, or a storage device, such as a hard disk or an optical disk. For example, the storage unit 15 stores therein various kinds of information detected by the detecting unit 14, in association with a date and time of detection.

Control Unit 16

The control unit 16 is implemented by, for example, executing various programs stored in an internal storage device of the user terminal 10 by a CPU, an MPU, or the like by using a RAM as a work area. Furthermore, the control unit 16 may be implemented by, for example, an integrated circuit, such as an ASIC or an FPGA.

As illustrated in FIG. 8, the control unit 16 includes an acquisition unit 161, a receiving unit 162, an authentication control unit 163, and a transmitting unit 164, and implements or executes functions and operations of information processing as described below. Incidentally, the internal configuration of the control unit 16 is not limited to the configuration as illustrated FIG. 8, and any other configurations that perform the information processing as described below are applicable.

Acquisition Unit 161

The acquisition unit 161 acquires various kinds of information. For example, the acquisition unit 161 controls the detecting unit 14, and acquires, as the context information indicating the context of the user terminal 10, various kinds of information detected by the detecting unit 14. Specifically, the acquisition unit 161 controls the location detecting unit 142 and acquires location information on the user terminal 10 and temporal information corresponding to a time at which the location information is detected.

The acquisition unit 161 may acquire the context information at predetermined time intervals. For example, the acquisition unit 161 periodically (for every one minute, three minutes, five minutes, or the like) controls the above-described detecting unit 14 and acquires the context information. Incidentally, a timing at which the acquisition unit 161 acquires the context information may be set by the determination apparatus 100.

Receiving Unit 162

The receiving unit 162 receives various kinds of information. For example, the receiving unit 162 receives a request for authentication information transmitted from the determination apparatus 100. The receiving unit 162 sends the received information to each of the processing units of the control unit 16.

Authentication Control Unit 163

The authentication control unit 163 controls the authentication process on the determination apparatus 100. For example, when the determination apparatus 100 transmits a request for the authentication information, the authentication control unit 163 performs a process on an authentication procedure corresponding to the requested authentication information. For example, the authentication control unit 163 specifies an authentication means corresponding to the requested authentication information. Then, the authentication control unit 163 performs a process corresponding to the authentication means.

For example, if the requested authentication information is fingerprint data of the user U01, the authentication control unit 163 displays a screen for inputting a fingerprint on the display unit 13. When accepting an input of the fingerprint data from the user U01, the authentication control unit 163 performs a process of transmitting the accepted fingerprint data to the determination apparatus 100. Then, the authentication control unit 163 sends, to the transmitting unit 164, data to be transmitted.

Transmitting Unit 164

The transmitting unit 164 transmits the context information acquired by the acquisition unit 161 to the determination apparatus 100. Furthermore, the transmitting unit 164 transmits the authentication information acquired by the authentication control unit 163 to the determination apparatus 100.

1-5. Flow of Process

Figure 9:
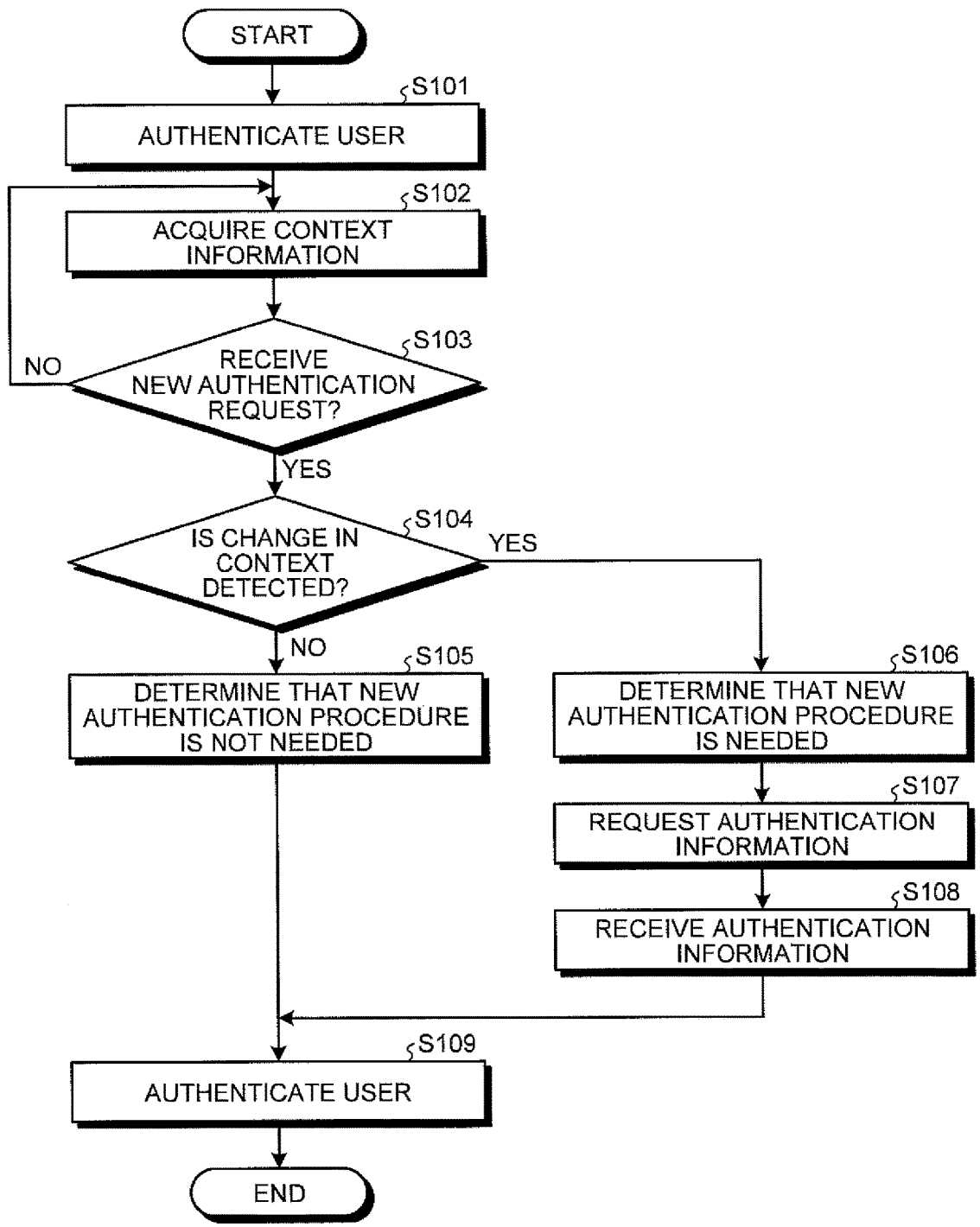
FIG. 9 is a flowchart illustrating the flow of the determination process according to the first embodiment.

Next, the flow of a process performed by the determination apparatus 100 according to the first embodiment will be described below with reference to FIG. 9. FIG. 9 is a flowchart illustrating the flow of a determination process according to the first embodiment.

As illustrated in FIG. 9, the authentication unit 133 authenticates the user U01 who uses the user terminal 10 (Step S101). Thereafter, the acquisition unit 134 periodically acquires the context information on the user terminal 10 (Step S102).

Subsequently, the receiving unit 132 determines whether a new authentication request is received from the user terminal 10 (Step S103). If the new authentication request is not received (NO at Step S103), the acquisition unit 134 continues a process of acquiring the context information.

In contrast, if the new authentication request is received (YES at Step S103), the determination unit 135 determines whether a change in the context of the user terminal 10 is detected (Step S104). If a change in the context is not detected (NO at Step S104), the determination unit 135 determines that a new authentication procedure on the user terminal 10 is not needed (Step S105).

In contrast, if a change in the context is detected (YES at Step S104), the determination unit 135 determines that a new authentication procedure on the user terminal 10 is needed (Step S106). In this case, the authentication unit 133 requests the user terminal 10 to provide authentication information (Step S107). Then, the receiving unit 132 receives the authentication information transmitted from the user terminal 10 (Step S108).

In the case of Step S105, the authentication unit 133 authenticates the user terminal 10 by using the acquired context information (Step S109). That is, the authentication unit 133 can authenticate the user terminal 10 while omitting an authentication procedure of requesting the user terminal 10 to transmit the authentication information. Furthermore, in the case of Step S108, the authentication unit 133 determines match with the transmitted authentication information and authenticates the user terminal 10 (Step S109).

Incidentally, the determination on a change in the context at Step S104 may be performed by comparison with a context registered in advance or by comparison with a context of the previous authentication.

1-6. Variation of Determination Process

In the above-described first embodiment, a process performed by the determination apparatus 100 has been described by using, for example, an example in which the user terminal 10 accesses a predetermined restricted site. Furthermore, an example has been described in which when predetermined determination is performed, the context itself is used as the authentication information and the user terminal 10 is authenticated without an authentication procedure. In this manner, the process in which the context itself is used as the authentication information may be applied to various situations. This will be described below with reference to FIG. 10.

Figure 10:
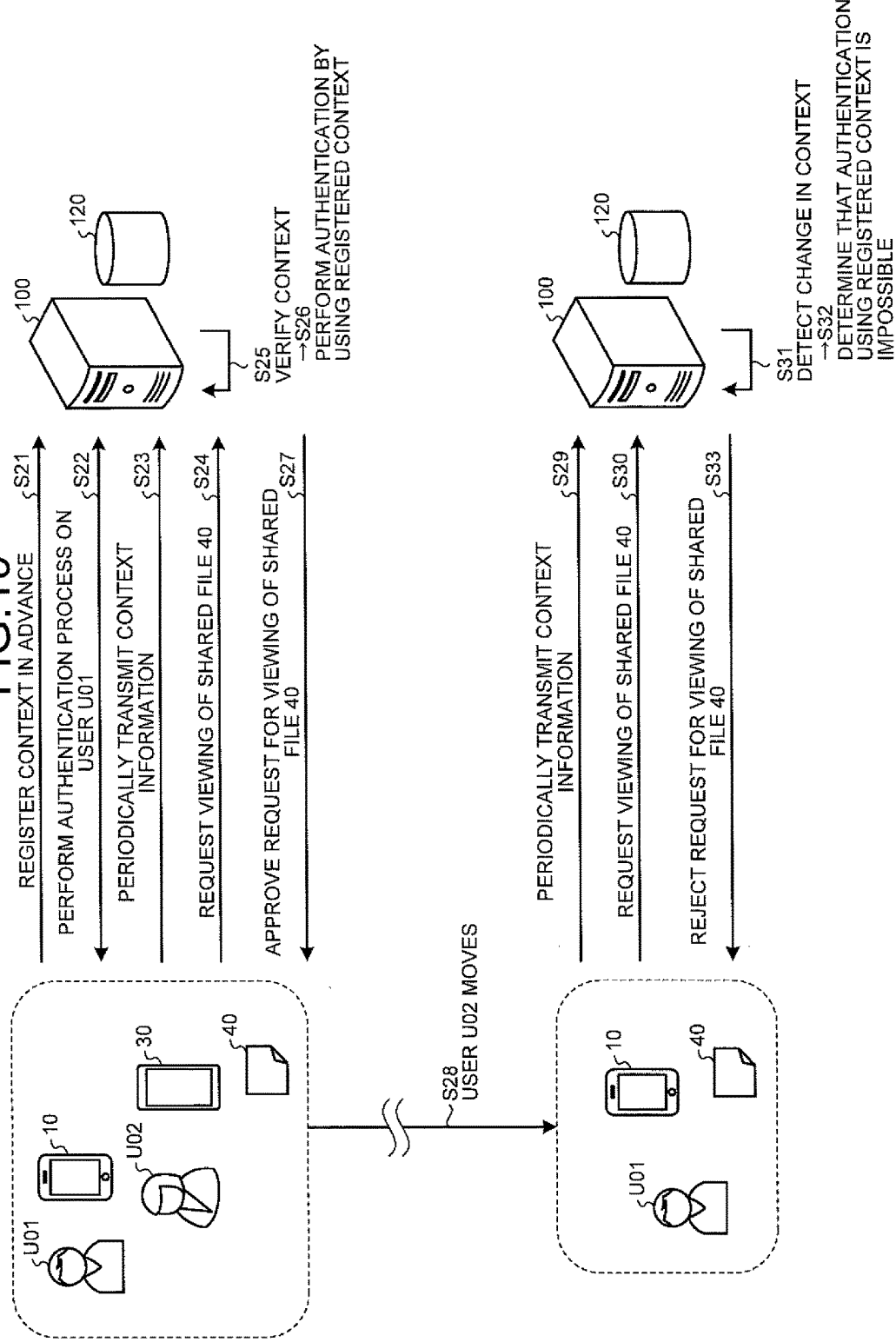
FIG. 10 is a diagram illustrating a determination process according to a modification of the first embodiment.

FIG. 10 is a diagram illustrating a determination process according to a modification of the first embodiment. In FIG. 10, an example is illustrated in which a plurality of users, such as the user U01 and a user U02 using a terminal device 30, use a shared file 40. To ensure the security, it is assumed that a predetermined access restriction is added to the shared file 40, and only limited users are allowed to view the shared file 40. Furthermore, it is assumed that an access to the shared file 40 is controlled by the determination apparatus 100.

In the example illustrated in FIG. 10, the user U01 registers a context in the determination apparatus 100 in advance (Step S21). For example, the user U01 registers, as a context, "near field communication between the user terminal 10 and the terminal device 30 is established".

The user U01 requests the determination apparatus 100 to perform authentication, and causes the determination apparatus 100 to perform an authentication process (Step S22). Accordingly, the user U01 is authenticated by the determination apparatus 100. Furthermore, in this case, it is assumed that the context such as "near field communication between the user terminal 10 and the terminal device 30 is established" is realized.

Thereafter, the user terminal 10 periodically transmits the context information (Step S23). After a lapse of a predetermined time, the user U01 requests the determination apparatus 100 to allow viewing of the shared file 40 (Step S24). The determination apparatus 100 verifies the context on the basis of the transmitted information (Step S25). Then, the determination apparatus 100 determines that the context such as "near field communication between the user terminal 10 and the terminal device 30 is established" is continuously maintained. In this case, the determination apparatus 100 authenticates the user U01 by using the registered context (Step S26). Consequently, the request for viewing of the shared file 40 by the user U01 is approved (Step S27).

Thereafter, it is assumed that the user U02 moves (Step S28), and the near field communication between the user terminal 10 and the terminal device 30 is disconnected. The user terminal 10 periodically transmits the context information as described above to the determination apparatus 100 (Step S29). Subsequently, the user terminal 10 requests the determination apparatus 100 to allow viewing of the shared file 40 (Step S30).

The determination apparatus 100 detects a change in the context on the basis of the transmitted information (Step S31). That is, the determination apparatus 100 determines that the context such as "near field communication between the user terminal 10 and the terminal device 30 is established" is changed. In this case, the determination apparatus 100 determines that authentication using the registered context is impossible (Step S32). Consequently, the request for viewing of the shared file 40 by the user U01 is rejected (Step S33).

As in the example illustrated in FIG. 10, with regard to a change in the context, the determination apparatus 100 can use a change in the context as the authentication information, in addition to determination on whether to perform an authentication procedure. In this case, if the context such as "near field communication between the user terminal 10 and the terminal device 30 is established", which is registered in the determination apparatus 100 in advance, is not realized, the user U01 becomes unable to use the shared file 40. As described above, according to the determination apparatus 100, it is possible to reject an access right that has been permitted, by determining a change in the context from a certain time point. Consequently, for example, it becomes possible to prevent a specific user from manipulating the shared file 40. Therefore, the determination apparatus 100 can provide a user with authentication with improved security.

1-7. Effects

As described above, the determination apparatus 100 according to the first embodiment includes the receiving unit 132, the acquisition unit 134, and the determination unit 135. The receiving unit 132 receives a request for authentication of the identity of the user U01 who uses the user terminal 10. The acquisition unit 134 acquires the context information that is information indicating the context of the user terminal 10. The determination unit 135 performs determination related to authentication requested by the user terminal 10, on the basis of the context information acquired by the acquisition unit 134.

As described above, the determination apparatus 100 according to the first embodiment determines whether or not to perform an authentication procedure, on the basis of the context of the user terminal 10 that is an authentication target. For example, if a context that is accepted from the user terminal 10 in advance and a context used at the time of authentication match each other, the determination apparatus 100 determines that a new authentication procedure is not needed. That is, the determination apparatus 100 can authenticate the user terminal 10 while omitting a new authentication procedure, so that it is possible to reduce time and effort on authentication and improve the convenience of users.

Furthermore, the determination unit 135 determines whether an authentication procedure for an authentication request received by the receiving unit 132 is needed, on the basis of a change between the context information that is acquired upon reception of the authentication request by the receiving unit 132 and the context information that has been acquired upon reception of a past authentication request.

As described above, the determination apparatus 100 according to the first embodiment performs a determination process based on a change between the context information that is acquired through past authentication (for example, through previous authentication) and the context information that is acquired through current authentication. Therefore, the determination apparatus 100 can verify the context information at a timing of every authentication, so that is possible to appropriately perform the determination process.

Moreover, the determination unit 135 determines whether an authentication procedure for an authentication request received by the receiving unit 132 is needed, on the basis of a change rate between the context information that is acquired upon reception of the authentication request by the receiving unit 132 and the context information that has been acquired upon reception of a past authentication request.

As described above, the determination apparatus 100 according to the first embodiment performs the determination process on the basis of a change rate of the context information between the time of a current authentication request and the time of a past authentication request. Consequently, the determination apparatus 100 can flexibly perform a process, such as to determine that the same user is continuously using the user terminal 10 when a change in the context information is small.

Furthermore, the determination unit 135 determines whether an authentication procedure is needed, on the basis of a change amount between the context information that is acquired upon reception of the authentication request by the receiving unit 132 and the context information that has been acquired upon reception of a past authentication request.

As described above, the determination apparatus 100 according to the first embodiment may perform the determination process based on the change amount of the context information. For example, when the context information is represented by a value, the determination apparatus 100 sets a predetermined threshold for the change amount of the value. Then, the determination apparatus 100 can determine whether the context of the user terminal 10 (or the user U01) is changed by determining whether the threshold is exceeded. That is, the determination apparatus 100 can flexibly perform the determination process by adjusting setting of the threshold or the like.

Furthermore, the determination unit 135 determines whether an authentication procedure is needed, on the basis of a pattern of a change between the context information that is acquired upon reception of the authentication request by the receiving unit 132 and the context information that has been acquired upon reception of a past authentication request.

As described above, the determination apparatus 100 according to the first embodiment may perform the determination process on the basis of a pattern of a change in the context information. Therefore, the determination apparatus 100 can determine the possibility that the user terminal 10 may be used by a different user even when, for example, a similar context is observed at the timing of authentication, and can request an authentication procedure. Consequently, the determination apparatus 100 can ensure the higher security.

Moreover, the determination apparatus 100 according to the first embodiment further includes the registration unit 131 that accepts registration of the context of the user terminal 10 when the user terminal 10 is authenticated. When the context information acquired upon reception of an authentication request indicates a context that has already been registered by the registration unit 131, the determination unit 135 determines that an authentication procedure for the authentication request is not needed.

As described above, the determination apparatus 100 according to the first embodiment can accept registration of a context in advance, and can perform the determination process based on a comparison with the registered context. By registering, in advance, a context in which authentication is likely to be required, a user can omit an authentication procedure when the registered context is observed. Consequently, the determination apparatus 100 can improve the convenience of authentication.

Furthermore, the determination apparatus 100 according to the first embodiment further includes the authentication unit 133 that performs an authentication procedure on the user terminal 10 when the determination unit 135 determines that the authentication procedure for an authentication request is needed, and that authenticates the user terminal 10 while omitting an authentication procedure when the determination unit 135 determines that the authentication procedure for an authentication request is not needed.

As described above, the determination apparatus 100 according to the first embodiment can determine whether to perform the authentication procedure in accordance with the determination process. Therefore, the determination apparatus 100 can improve the convenience of a user by omitting the authentication procedure when the context information is reliable, and can improve the security of the authentication by performing the authentication procedure when the context information is not reliable. In this manner, the determination apparatus 100 can perform the authentication process with improved convenience while ensuring the security.

2. Second Embodiment

In the above-described first embodiment, an example has been described in which whether an authentication procedure is needed is determined on the basis of a change in the context information that is acquired at the previous authentication and the context information that is acquired upon reception of a new authentication request. Furthermore, an example has been described in which, in the determination process, registration of a context used for authentication is accepted in advance from a user and whether an authentication procedure is needed is determined on the basis of a change between the registered context and a context that is acquired upon reception of a new authentication request. Incidentally, the embodiment of the present application is applicable to a case in which a determination process is performed by estimating a context used for the determination, rather than by accepting registration in advance. This will be described as a second embodiment. Incidentally, the same explanation as given in the first embodiment will not be repeated.

2-1. Example of Determination Process

Figure 11:
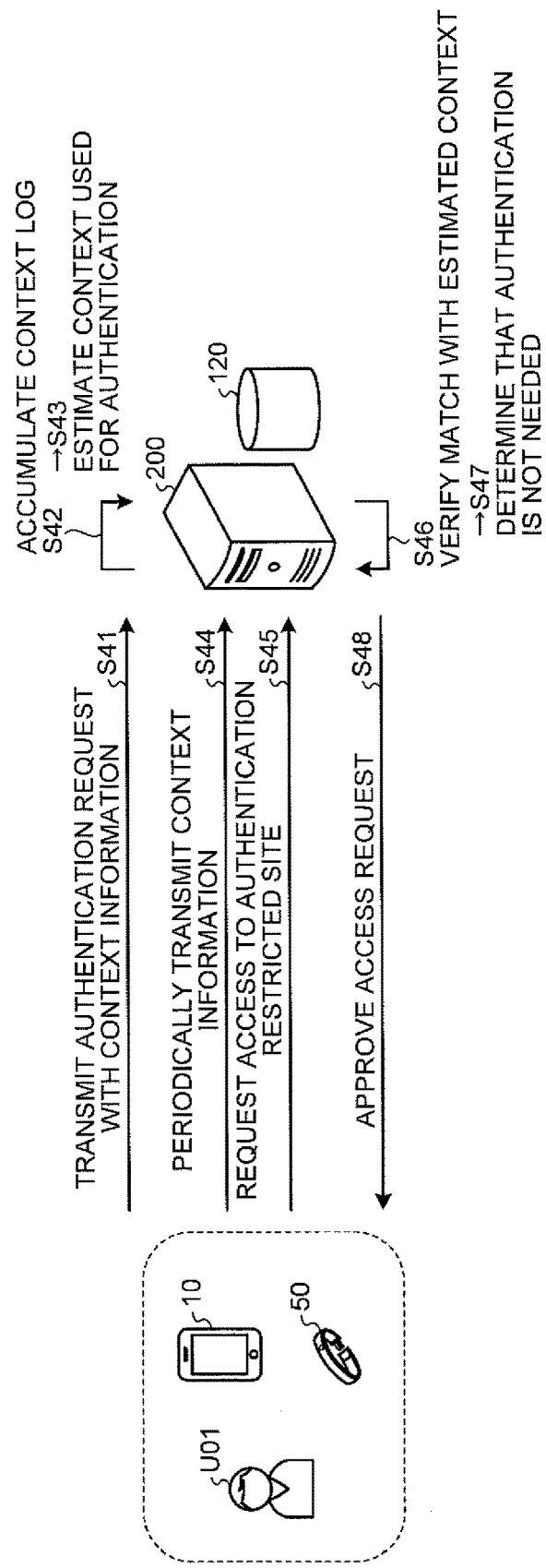
FIG. 11 is a diagram illustrating an example of a determination process according to a second embodiment.

First, an example of a determination process according to the second embodiment will be described with reference to FIG. 11. FIG. 11 is a diagram illustrating an example of the determination process according to the second embodiment. A determination apparatus 200 illustrated in FIG. 11 estimates a predetermined context related to the user terminal 10, and performs a determination process based on the estimated context.

The user U01 illustrated in FIG. 11 is a user who uses the user terminal 10 and a smartwatch 50. For example, when the user U01 accesses a predetermined restricted site by using the user terminal 10, the user U01 requests the determination apparatus 200 to perform authentication. The user U01 transmits an authentication request and context information on the user terminal 10 (Step S41). In this case, the context information transmitted from the user terminal 10 is, for example, "near field communication between the user terminal 10 and the smartwatch 50 is established" or the like.

The determination apparatus 200 accumulates the acquired context log in the storage unit 120 (Step S42). Then, the determination apparatus 200 estimates a context to be used for authentication, in accordance with a predetermined estimation rule (Step S43). While details will be described later, it is assumed that, for example, the determination apparatus 200 acquires the context information such as "near field communication between the user terminal 10 and the smartwatch 50 is established" with high probability when authenticating the user terminal 10. Furthermore, it is assumed that the determination apparatus 200 has a rule in which when the same context information is acquired a certain number of times among a predetermined number of times of authentication, a context indicated by the context information is estimated as a context to be used for authentication. In this case, the determination apparatus 200 estimates a context such as "near field communication between the user terminal 10 and the smartwatch 50 is established" as the context to be used for authentication.

Thereafter, the user terminal 10 periodically transmits the context information to the determination apparatus 200 (Step S44). Then, at a certain timing, the user terminal 10 requests an access to an authentication restricted site (Step S45). In this case, the determination apparatus 200 verifies whether the context indicated by the periodically-transmitted context information, the context indicated by the context information acquired when the access is requested, and the estimated context match one another (Step S46). This process is the same as the process described in the first embodiment, in which the determination apparatus 100 verifies whether the context information registered in advance or the periodically-transmitted context information matches the context information acquired when an access is requested.

Then, the determination apparatus 200 determines that the estimated context matches the context that is acquired when an access is requested. Specifically, because the user terminal 10, which is normally authenticated with the context information such as "near field communication between the user terminal 10 and the smartwatch 50 is established", is currently requesting authentication with the same context information, the determination apparatus 200 determines that the user terminal 10 is operated by the normally-authenticated user U01 with high probability.

Then, the determination apparatus 200 determines that a new authentication procedure is not needed with respect to the access request issued at Step S45 (Step S47). Then, the determination apparatus 200 approves the access request from the user terminal 10 while omitting a new authentication procedure (Step S48).

In this manner, the determination apparatus 200 according to the second embodiment includes an estimating means for estimating a context. Then, the determination apparatus 200 performs the determination process related to authentication of the user U01 on the basis of a change in the estimated context. Consequently, the determination apparatus 200 can determine match of the context without accepting registration of a context from the user U01 in advance. Therefore, the determination apparatus 200 can perform an appropriate determination process without causing the user U01 to perform a cumbersome process.

2-2. Configuration of Determination Apparatus

Figure 12:
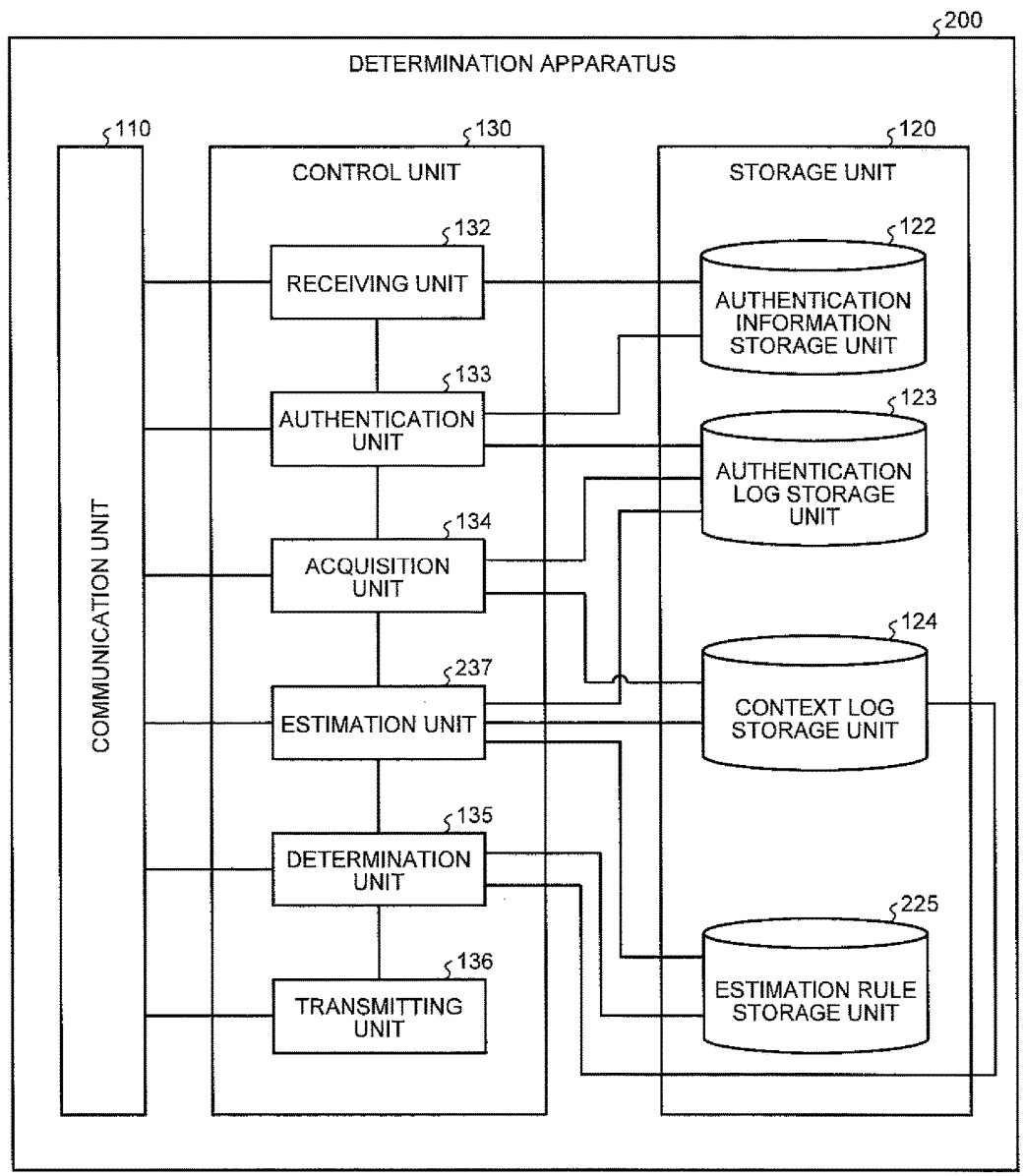
FIG. 12 is a diagram illustrating a configuration example of a determination apparatus according to the second embodiment.

Next, a configuration of the determination apparatus 200 according to the second embodiment will be described with reference to FIG. 12. FIG. 12 is a diagram illustrating a configuration example of the determination apparatus 200 according to the second embodiment. As illustrated in FIG. 12, the determination apparatus 200 includes an estimation rule storage unit 225 and an estimation unit 237.

Estimation Rule Storage Unit 225

The estimation rule storage unit 225 stores therein a rule for estimating a context. For example, the estimation rule storage unit 225 stores therein a rule for calculating the similarity of a context used to estimate a context. Furthermore, the estimation rule storage unit 225 may store therein a rule, in which, for example, when the context log is accumulated a predetermined number of times or more, the context is estimated as a context used for the determination process. The estimation rule stored in the estimation rule storage unit 225 is manually set by, for example, an administrator or the like of the determination apparatus 200 and then stored.

Estimation Unit 237

The estimation unit 237 estimates a context of the user terminal 10 at the time of authentication of the user terminal 10, on the basis of the context information acquired by the acquisition unit 134. In this case, if the context information acquired upon reception of an authentication request indicates the context estimated by the estimation unit 237, the determination unit 135 may determine that an authentication procedure for the authentication request is not needed.

The estimation unit 237 estimates a context used for the determination process on the basis of the estimation rule stored in the estimation rule storage unit 225. Furthermore, the estimation unit 237 may perform a process of estimating a context when the context of the user terminal 10 is not certainly determined from the context information acquired by the acquisition unit 134.

That is, when the context is not certainly determined, the estimation unit 237 calculates the similarity of a context by using as many pieces of the context information as obtained. Specifically, the estimation unit 237 derives a similar context by referring to the context log, the authentication log, and the context information included in the authentication log. Then, the estimation unit 237 estimates the derived similar context as a context indicated by the context information.

As described in the first embodiment, the acquisition unit 134 acquires various kinds of information as the context information. However, the acquisition unit 134 is not always able to acquire the context information that confirms the context of the user terminal 10. In this case, the estimation unit 237 performs a process of estimating a context based on the acquired context information in accordance with a predetermined rule. Consequently, the determination apparatus 200 can appropriately perform the determination process even when only relatively a small number of pieces of context information are acquired.

2-3. Effects

As described above, the determination apparatus 200 according to the second embodiment includes the estimation unit 237 that estimates the context of the user terminal 10 at the time of authentication of the user terminal 10, on the basis of the context information acquired by the acquisition unit 134. Furthermore, if the context information acquired upon reception of an authentication request indicates the context estimated by the estimation unit 237, the determination unit 135 determines that an authentication procedure for the authentication request is not needed.

As described above, the determination apparatus 200 according to the second embodiment can estimate a context used for the determination process. For example, the determination apparatus 200 estimates a context that is likely to occur at the time of authentication of a user without a need of a registration process beforehand, and performs the determination process by using the estimated context. Consequently, if identity confirmation is ensured by a context without taking time and effort in registration or the like beforehand, a user can omit an authentication procedure. That is, the determination apparatus 200 can improve the convenience of the user.

Furthermore, the estimation unit 237 estimates the context of the user terminal 10 at the time of authentication of the user terminal 10, on the basis of the similarity between the context information log acquired by the acquisition unit 134 and the context information log that is acquired in past authentication of the user terminal 10.

As described above, the determination apparatus 200 according to the second embodiment estimates the context of the user terminal 10 based on a context log. Consequently, the determination apparatus 200 can improve the estimation accuracy of a context and can appropriately perform the determination process.

3. Third Embodiment

In the above-described second embodiment, an example has been described in which the determination apparatus 200 includes the estimation unit 237 and the estimation rule storage unit 225. Incidentally, the determination apparatus of the present application may be configured to include a learning unit that performs predetermined learning based on the estimation process performed by the estimation unit 237 and updates the estimation rule in accordance with the learning. This will be described as a third embodiment. The same explanation as given in the first and the second embodiments will not be repeated.

3-1. Configuration of Determination Apparatus

Figure 13:
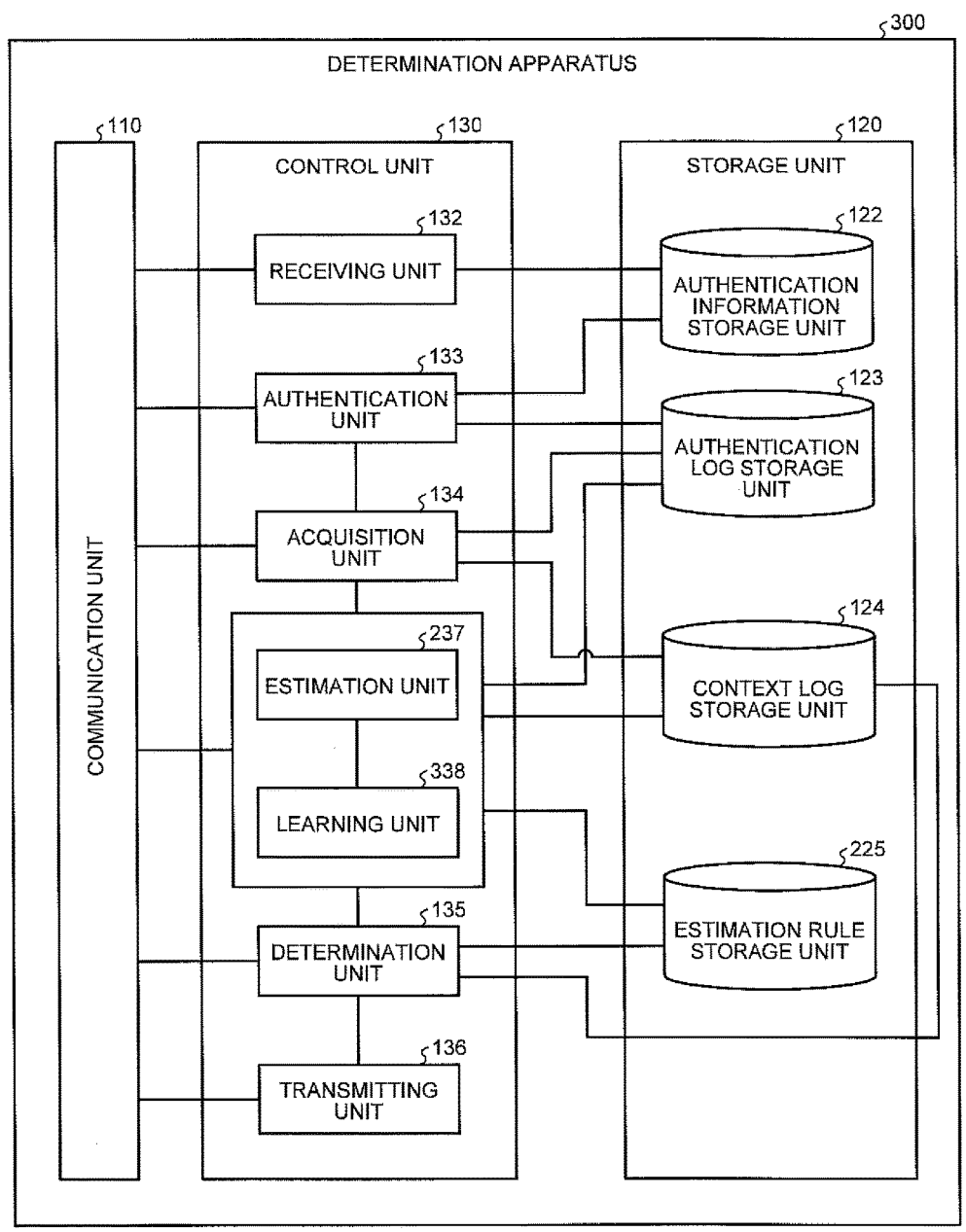
FIG. 13 is a diagram illustrating a configuration example of a determination apparatus according to a third embodiment.

A configuration of a determination apparatus 300 according to the third embodiment will be described with reference to FIG. 13. FIG. 13 is a diagram illustrating a configuration example of the determination apparatus 300 according to the third embodiment. As illustrated in FIG. 13, the determination apparatus 300 includes a learning unit 338.

Learning Unit 338

The learning unit 338 performs learning on an estimation rule that is used when the estimation unit 237 estimates a context. As described in the second embodiment, the estimation unit 237 estimates a context at the time of authentication of the user terminal 10 on the basis of, for example, the similarity between a context information log and a context information log that is acquired when the user terminal 10 is authenticated in the past, in accordance with a predetermined estimation rule. The learning unit 338 updates the estimation rule based on a result of the estimation process performed by the estimation unit 237, to thereby improve the accuracy of the estimation process performed by the estimation unit 237.

For example, the learning unit 338 learns right or wrong of a context when a context is determined after the estimation unit 237 has performed the estimation process or when a context is determined based on the context information that is newly acquired at the time of authentication. Then, the learning unit 338 learns an estimation rule of a context in accordance with an accumulated result of the estimation process. For example, the learning unit 338 performs learning based on an estimation result of a context related to the user U01 who is a specific user, where the estimation result is accumulated by repeating the estimation process on the user U01. Consequently, the learning unit 338 can accurately update the estimation rule based on an environment that is always used by the user U01, device information, or the like, so that it is possible to improve the accuracy of the estimation process. Furthermore, the learning unit 338 may generate a new rule by using a past existent estimation rule when the user terminal 10 is in a context whose information as a log is not provided.

Moreover, the estimation unit 237 may estimate the context of the user terminal 10 on the basis of an estimation rule that is learned by the learning unit 338 and that is learned in accordance with a user other than the user U01 who uses the user terminal 10. That is, the learning unit 338 may apply, as a meta rule, an estimation rule obtained as a result of learning on a user other than the user U01, to the user U01. More specifically, the learning unit 338 can apply the estimation rule generated as a result of learning to not only a specific user but also a general user. Consequently, the estimation unit 237 can further improve the estimation accuracy of the context. Incidentally, the learning process performed by the learning unit 338 as described above may be performed by combining known learning processing methods.

3-2. Effects

As described above, the determination apparatus 300 according to the third embodiment includes the learning unit 338 that performs learning related to the estimation rule to be used when the estimation unit 237 estimates a context. Furthermore, the estimation unit 237 estimates the context of the user terminal 10 on the basis of an estimation rule that is learned by the learning unit 338 and that is learned in accordance with the user U01 who uses the user terminal 10.

In this manner, the determination apparatus 300 according to the third embodiment can obtain, by learning, a rule used for the estimation process. Therefore, the determination apparatus 300 can estimate a context with higher accuracy as the process progresses. Consequently, the determination apparatus 300 can appropriately determine whether to cause the user to perform an authentication procedure, so that it is possible to improve the convenience of the user.

Furthermore, the estimation unit 237 estimates the context of the user terminal 10 on the basis of the estimation rule that is learned by the learning unit 338 and that is learned in accordance with a user other than the user U01 who uses the user terminal 10.

As described above, the determination apparatus 300 according to the third embodiment can apply, as meta data, data that is learned in accordance with a predetermined user to a different user. Therefore, even when unknown context information is acquired, the determination apparatus 300 can estimate a context with high accuracy, so that it is possible to improve the accuracy of each process performed by the determination apparatus 300.

4. Modification

The above-described determination apparatus 100 may be embodied in various forms other than the above-described embodiments. Therefore, another embodiment of the determination apparatus 100 (including the determination apparatus 200 and the determination apparatus 300) will be described below.

4-1. Authentication in Terminal

In the above-described embodiments, an example has been described in which the determination apparatus 100 authenticates the user terminal 10 based on the authentication information transmitted from the user terminal 10. Incidentally, the user terminal 10 may employ a method of performing authentication of the user U01 inside the user terminal 10 and transmitting only a result of the authentication to the determination apparatus 100, instead of transmitting the authentication information itself to the determination apparatus 100.

In this case, the user terminal 10 stores, inside the user terminal 10, correct answer data for authenticating the user U01. Then, upon accepting a request for an authentication procedure, the user terminal 10 authenticates the user U01 by a predetermined authentication means. For example, the user terminal 10 stores correct answer data for fingerprint data of the user U01 in advance, and requests the user U01 to input fingerprint data at the time of authentication. Then, the user terminal 10 transmits only information indicating that authentication is completed inside the user terminal 10 to the determination apparatus 100. Consequently, the user terminal 10 can perform an authentication procedure without transmitting the authentication information itself, such as fingerprint data or a password, over a network. As a result, the security of the process performed by the determination apparatus 100 is further ensured.

4-2. Determination by Authentication Means

In the above-described embodiments, a case has been described in which the determination apparatus 100 determines whether to perform a new authentication procedure. Incidentally, the determination apparatus 100 may perform other determination as the determination related to authentication, in addition to determination on whether to perform a new authentication procedure.

For example, the determination apparatus 100 may determine the authentication means used for an authentication procedure. Specifically, the determination apparatus 100 may estimate the context of the user terminal 10 on the basis of information acquired from various sensors used by the user terminal 10, and may determine an authentication means appropriate for the context. For example, if the illuminance around the user terminal 10 is not enough to capture an iris image, the determination apparatus 100 determines to perform an authentication procedure by using a different authentication means rather than using iris as the authentication means. Alternatively, if a noise level around the user terminal 10 is too high to recognize a voice by a microphone of the user terminal 10, the determination apparatus 100 determines to perform an authentication procedure by using a different authentication means rather than using voice as the authentication means. Furthermore, if authentication is performed in a context similar to that of the previous authentication on the basis of an authentication log, a context log, or the like, the determination apparatus 100 may determine to perform an authentication procedure by using an authentication means that is used in the past authentication. As described above, the determination apparatus 100 may perform a process of determining an appropriate authentication means based on the context information on the user terminal 10.

4-3. Identification of User Terminal

In the above-described first embodiment, an example has been described in which the determination apparatus 100 acquires a user ID to identify a plurality of the user terminals 10. Incidentally, when identifying a plurality of the user terminals 10, the determination apparatus 100 need not always acquire global identifiers common to other devices. That is, it is sufficient that the determination apparatus 100 acquires an identifier that can identify the user terminal 10 in a process to be executed, and it is not always necessary to acquire an identifier that is permanently determined.

Furthermore, if the determination process is performed based on the context information obtained by one-to-one communication, such as communication between the user terminal 10 and a different terminal device as illustrated in FIG. 1 and FIG. 10, it is not always necessary to acquire a user ID or a device ID. Moreover, even when the determination process is performed by communication among three or more devices, it is sufficient that the determination apparatus 100 acquires an identifier that can identify each of the terminals, and it may be possible to acquire an identifier by, for example, appropriately issuing a temporary identifier.

4-4. Configuration of User Terminal

In the above-described first embodiment, a configuration example of the user terminal 10 has been described with reference to FIG. 8. However, the user terminal 10 need not always include all of the processing units illustrated in FIG. 8. For example, the user terminal 10 need not always include the display unit 13 or the detecting unit 14. Furthermore, the user terminal 10 may be separated into two or more devices to implement the configuration illustrated in FIG. 8. For example, the user terminal 10 may be implemented by two or more separated devices such as a detecting device including at least the detecting unit 14 and a communication device including at least the communication unit 11.

4-5. Device for Providing Service

In the above-described embodiment, the web server 60 is described as a device that provides an authentication restricted site to be accessed by the user terminal 10. However, the device that provides the service as described above is not limited to the web server 60. For example, the device that provides the service is not limited to a web service, but may be a network service that handles a different type of a protocol other than a hypertext transfer protocol (HTTP) or may be a device that provides communication or an application that handles Internet of things (IoT). That is, the device that provides a service is not limited to the web server 60 but may be any device as long as the device can communicate with the determination apparatus 100, the user terminal 10, or the like and has a function to use the determination process, the authentication process, or the like performed by the determination apparatus 100.

4-6. Determination Process

In the above-described embodiments, an example has been described in which the determination apparatus 100 determines whether or not to perform an authentication procedure as illustrated in FIG. 9, for example. Incidentally, the determination apparatus 100 may perform determination related to the strength of an authentication procedure.

For example, the determination apparatus 100 performs determination related to the strength of an authentication procedure on the basis of a change in the context information. The determination of the strength of the authentication indicates, for example, a process of determining what kind of authentication information is needed to confirm identity in the authentication process, such as to determine whether to perform multi-factor authentication.

For example, it is assumed that the determination apparatus 100 normally requests a user to perform multi-factor authentication using a password and a fingerprint. Then, when a change in the context information acquired from the user is within a predetermined threshold, the determination apparatus 100 determines that the device is highly likely to be continuously operated by the same user, and can reduce the strength of the authentication procedure. Specifically, the determination apparatus 100 can change the strength of the authentication process, such as to authenticate a user only through an authentication procedure using a password. Alternatively, as for a user for whom the same context as the previous authentication is expected but the authentication itself is performed for the first time in a year, the determination apparatus 100 can increase the strength of the authentication process by requesting a voiceprint as the authentication information in addition to a password and a fingerprint.

Furthermore, the determination apparatus 100 may perform a learning process to determine the strength of the authentication process as described above. For example, it is assumed that the determination apparatus 100 employs conditions such as "registered context" and "triple authentication means (for example, a password, a fingerprint, and a voiceprint)" as the conditions for the authentication process to be performed on a predetermined user. Then, the determination apparatus 100 acquires a history indicating that the user has performed the authentication process for, for example, three months by using the "registered context" and the "triple authentication means". The determination apparatus 100 can change the authentication means such as the "triple authentication means" to "double authentication means, a "single authentication means", or "no authentication means" with respect to the user based on the history as described above. That is, the determination apparatus 100 learns that the reliability is high with respect to the user for whom the authentication process has been accurately performed in the same context for a predetermined period or longer, and can appropriately determine to change the authentication means. In other words, the determination apparatus 100 can use the context itself such as "authentication in the same context is continued everyday for three months" as an element for determination.

4-7. Acquisition Process

In the above-described embodiments, an example has been described in which the determination apparatus 100 periodically acquires the context information from the user terminal 10. However, the determination apparatus 100 need not always continue to periodically acquire the context information, but may acquire only context information used for the determination process.

For example, the determination apparatus 100 may use, as an element for determination, only a difference in the context information between the current authentication and the previous authentication. In this case, the determination apparatus 100 may determine presence or absence of an authentication procedure at a timing of authentication, regardless of a behavior of the user during an interval of the authentication. Furthermore, the determination apparatus 100 may periodically acquire the context information during an interval of the authentication as described in the first embodiment. In this case, even when the same context is observed at the timing of the authentication, the determination apparatus 100 may request an authentication procedure in accordance with a change in the context information during the interval of the authentication. A specific example will be described below. It is assumed that the determination apparatus 100 authenticates a predetermined user in a conference room. Thereafter, it is assumed that the user exits the conference room once along the way, and then attempts to perform authentication in the conference room again. In this case, the determination apparatus 100 may or may not request the user to perform an authentication procedure. In this manner, even when the same context is observed at a timing at which the user attempts authentication, the determination apparatus 100 can determine whether to request authentication. Consequently, the determination apparatus 100 can realize access control at an appropriate level that is not too cumbersome for the user.

5. Hardware Configuration

Figure 14:
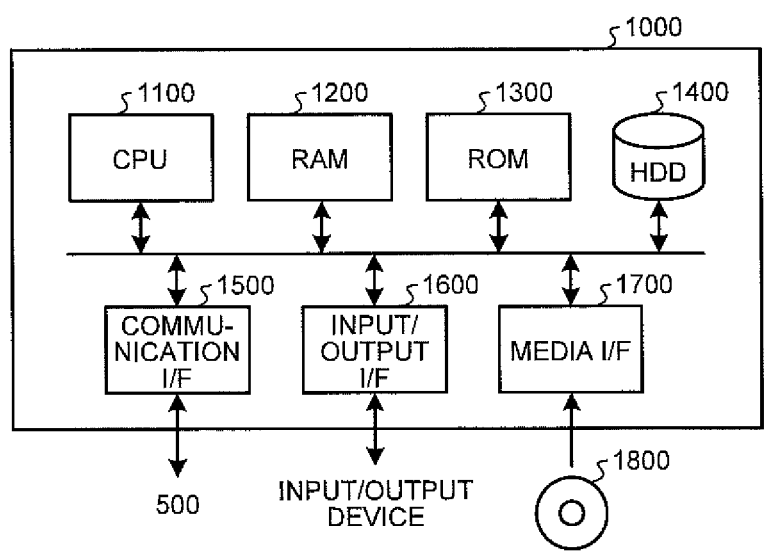
FIG. 14 is a diagram illustrating an example of a hardware configuration of a computer that implements functions of the determination apparatus.

The determination apparatus according to each of the above-described embodiments is implemented by, for example, a computer 1000 configured as illustrated in FIG. 14. The determination apparatus 100 will be described below as an example. FIG. 14 is a hardware configuration diagram illustrating an example of the computer 1000 that implements the functions of the determination apparatus. The computer 1000 includes a CPU 1100, a RAM 1200, a ROM 1300, an HDD 1400, a communication interface (I/F) 1500, an input output I/F 1600, and a media I/F 1700.

The CPU 1100 operates based on a program stored in the ROM 1300 or the HDD 1400, and controls each of the units. The ROM 1300 stores therein a boot program that is executed by the CPU 1100 at the time of activation of the computer 1000, a program that depends on hardware of the computer 1000, or the like.

The HDD 1400 stores therein a program executed by the CPU 1100, data used by the program, or the like. The communication I/F 1500 receives data from other devices via a communication network 500 (corresponding to the network N illustrated in FIG. 2), sends the data to the CPU 1100, and transmits data generated by the CPU 1100 to other devices via the communication network 500.

The CPU 1100 controls an output device, such as a display or a printer, and an input device, such as a keyboard or a mouse, through the input output I/F 1600. The CPU 1100 acquires data from the input device through the input output I/F 1600. Furthermore, the CPU 1100 outputs data to the output device through the input output I/F 1600.

The media I/F 1700 reads a program or data stored in a recording medium 1800, and provides the program or the data to the CPU 1100 via the RAM 1200. The CPU 1100 loads the program from the recording medium 1800 onto the RAM 1200 through the media I/F 1700, and executes the loaded program. The recording medium 1800 is, for example, an optical recording medium, such as a digital versatile disc (DVD) or a phase change rewritable disk (PD), a magneto optical recording medium, such as a magneto-optical disk (MO), a tape medium, a magnetic recording medium, a semiconductor memory, or the like.

For example, when the computer 1000 functions as the determination apparatus 100 according to the first embodiment, the CPU 1100 of the computer 1000 implements the functions of the control unit 130 by executing a program loaded on the RAM 1200. Furthermore, the HDD 1400 stores therein data stored in the storage unit 120. The CPU 1100 of the computer 1000 reads the program from the recording medium 1800 and executes the program. For another example, the program may be acquired from other devices through the communication network 500.

6. Others

Of the processes described in the embodiments, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in the drawings are not limited to the information illustrated in the drawings.

Furthermore, the components illustrated in the drawings are functionally conceptual and need not necessarily be physically configured in the manner illustrated in the drawings. That is, specific forms of distribution and integration of the apparatuses are not limited to those illustrated in the drawings, and all or part of the apparatuses may be functionally or physically distributed or integrated in arbitrary units depending on various loads or use conditions. For example, the authentication unit 133 and the acquisition unit 134 illustrated in FIG. 3 may be integrated. For another example, information stored in the storage unit 120 may be stored in an externally-provided storage device through the network N.

Furthermore, for example, in the above-described embodiments, an example has been described in which the determination apparatus 100 performs the acquisition process of acquiring the context information on the user terminal 10, the determination process of determining the need of authentication, and the authentication process of authenticating the user. However, the above-described determination apparatus 100 may be separated into an acquisition apparatus that performs the acquisition process, a determination apparatus that performs the determination process, and an authentication apparatus that performs the authentication process. In this case, for example, the process performed by the determination apparatus 100 according to the first embodiment is realized by the determination processing system 1 including various apparatuses, such as the acquisition apparatus, the determination apparatus, and the authentication apparatus.

Furthermore, the above-described embodiments and modifications may be combined appropriately as long as the processes do not conflict with each other.

While the embodiments of the present invention have been described in detail above based on the drawings, the embodiments are described by way of example, and the present invention may be embodied in various other forms with various changes or modifications based on knowledge of persons skilled in the art, in addition to the embodiments described in this specification.

Furthermore, "a unit" recited in the claims may be replaced with "a section, a module, or a means" or "a circuit". For example, the acquisition unit may be replaced with an acquisition means or an acquisition circuit.

According to an embodiment of the present invention, it is possible to perform personal authentication with good convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A determination apparatus comprising:
   a network communication interface configured to communicate with a plurality of terminal devices over a network; and
   a processor programmed to:
      upon receiving, via the network communication interface from one terminal device of the plurality of terminal devices, a request for authentication of an identity of a user who uses the one terminal device:
      acquire, via the network communication interface from the one terminal device, context information that is information indicating a context of the one terminal device, wherein the context information includes both information indicating a communicating state between the one terminal device and one or more home devices, and at least one of: information indicating that the one terminal device is located at a home of the user, and information indicating whether a communicating state between the one terminal device and the determination apparatus is established;
      determine whether the context information and previous context information are within a predetermined threshold;
      when the context information and the previous context information are not within the predetermined threshold: perform a first type of authentication procedure; and
      when the context information and the previous context information are within the predetermined threshold: determine that the one terminal device is continuously operated by the same user, and perform a second type of authentication procedure that is different from the first type of authentication procedure, the second type of authentication having a reduced strength of authentication compared to the first type of authentication, wherein the context information is context information acquired at a first time point and the previous context information is context information acquired at a second time point at which another authentication request was previously-received.

2. The determination apparatus according to claim 1, wherein the processor is further programmed to: determine whether the context information and the previous context information are within the predetermined threshold based on a rate of change between the context information and the previous context information.

3. The determination apparatus according to claim 1, wherein the processor is further programmed to: determine whether the context information and the previous context information are within the predetermined threshold based on a pattern of change from among change between the context information and the previous context information, and previous changes from among previous context information changes.

4. The determination apparatus according to claim 1, wherein the processor is further programmed to:
   accept registration of a context of the one terminal device when the one terminal device is authenticated,
   determine whether the estimated context information and the context information are within the predetermined threshold; and
   when the context information and the estimated context information are within the predetermined threshold: perform the second type of authentication procedure.

5. The determination apparatus according to claim 1, wherein the processor is further programmed to:
   estimate context information of the one terminal device;
   determine whether the estimated context information and the context information are within the predetermined threshold; and
   when the context information and the estimated context information are within the predetermined threshold: perform the second type of authentication procedure.

6. The determination apparatus according to claim 5, wherein the estimation of the context information of the one terminal device is based on a similarity between an acquired context information log and a past context information log.

7. The determination apparatus according to claim 5, wherein the processor is further programmed to:
   perform learning of an estimation rule to be used when estimating the context, the estimation rule being learned in accordance with the user who uses the one terminal device; and
   estimate the context information of the one terminal device based on the estimation rule that is learned.

8. The determination apparatus according to claim 5, wherein the processor is further programmed to:
   perform learning of an estimation rule to be used when estimating the context, the estimation rule being learned in accordance with a user other than the user who uses the one terminal device; and
   estimate the context information of the one terminal device based on the estimation rule that is learned.

9. A determination method implemented by a computer, comprising:
   upon receiving, via a network communication interface from one terminal device of the plurality of terminal devices, a request for authentication of an identity of a user who uses the one terminal device:
   acquiring, via a network communication interface from the one terminal device, context information that is information indicating a context of the one terminal device, wherein the context information includes both information indicating a communicating state between the one terminal device and one or more home devices, and at least one of: information indicating that the one terminal device is located at a home of the user, and information indicating whether a communicating state between the one terminal device and the determination apparatus is established;

determining whether the context information and previous context information are within a predetermined threshold;

when the context information and the previous context information are not within the predetermined threshold: performing a first type of authentication procedure; and when the context information and the previous context information are within the predetermined threshold: determining that the one terminal device is continuously operated by the same user, and performing a second type of authentication procedure that is different from the first type of authentication procedure, the second type of authentication having a reduced strength of authentication compared to the first type of authentication, wherein the context information is context information acquired at a first time point and the previous context information is context information acquired at a second time point at which another authentication request was previously-received.

10. A non-transitory computer readable storage medium having stored therein a computer-executable program including instructions that, when executed by a computer causes the computer to:

upon receiving, via a network communication interface from one terminal device of the plurality of terminal devices, a request for authentication of an identity of a user who uses the one terminal device:

acquire, via the network communication interface from the one terminal device, context information that is information indicating a context of the one terminal device, wherein the context information includes both information indicating a communicating state between the one terminal device and one or more home devices, and at least one of: information indicating that the one terminal device is located at a home of the user, and information indicating whether a communicating state between the one terminal device and the determination apparatus is established;

determine whether the context information and previous context information are within a predetermined threshold;

when the context information and the previous context information are not within the predetermined threshold: perform a first type of authentication procedure; and when the context information and the previous context information are within the predetermined threshold: determine that the one terminal device is continuously operated by the same user, and perform a second type of authentication procedure that is different from the first type of authentication procedure, the second type of authentication having a reduced strength of authentication compared to the first type of authentication, wherein the context information is context information acquired at a first time point and the previous context information is context information acquired at a second time point at which another authentication request was previously-received.

* * * * *